(12) United States Patent
Sheha et al.

(10) Patent No.: US 9,307,365 B2
(45) Date of Patent: Apr. 5, 2016

(54) METHOD AND SYSTEM FOR SAVING AND RETRIEVING SPATIAL RELATED INFORMATION

(71) Applicant: TeleCommunication Systems, Inc., Annapolis, MD (US)

(72) Inventors: Michael Sheha, Laguna Niguel, CA (US); Angie Sheha, Laguna Niguel, CA (US); Stephen Petilli, Laguna Niguell, CA (US); Mark Goddard, Rancho Santa Margarita, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/840,487

(22) Filed: Aug. 31, 2015

(65) Prior Publication Data

US 2015/0373499 A1    Dec. 24, 2015

Related U.S. Application Data

(60) Continuation of application No. 14/336,732, filed on Jul. 21, 2014, now Pat. No. 9,217,651, which is a continuation of application No. 13/784,124, filed on Mar. 4, 2013, now Pat. No. 8,786,469, which is a continuation of application No. 13/459,880, filed on Apr. 30, 2012, now Pat. No. 8,390,480, which is a continuation of application No. 12/929,476, filed on Jan. 27, 2011, now Pat. No. 8,169,343, which is a division of application No. 12/662,824, filed on May 5, 2010, now Pat. No. 7,903,001, which is a continuation of application No. 11/824,911, filed on Jul. 3, 2007, now Pat. No. 7,737,868, which is a division of application No. 10/781,087, filed on Feb. 17, 2004, now Pat. No. 7,256,711.

(60) Provisional application No. 60/447,567, filed on Feb. 14, 2003.

(51) Int. Cl.
*G08G 1/123*    (2006.01)
*H04W 4/02*    (2009.01)
*G01C 21/26*    (2006.01)

(52) U.S. Cl.
CPC ............... *H04W 4/027* (2013.01); *G01C 21/26* (2013.01)

(58) Field of Classification Search
CPC ........................ G08G 1/0968; G01C 21/3697
USPC .................... 340/995.13, 990, 539.1, 539.13; 455/414.2; 701/412, 465
See application file for complete search history.

(56) References Cited

U.S. PATENT DOCUMENTS

| | | | | |
|---|---|---|---|---|
| 5,790,974 A | * | 8/1998 | Tognazzini | .......... G01C 21/343 340/988 |
| 6,331,825 B1 | * | 12/2001 | Ladner | .................. B60R 25/102 340/988 |
| 6,377,210 B1 | * | 4/2002 | Moore | ................... G01C 21/26 342/357.4 |
| 6,525,768 B2 | * | 2/2003 | Obradovich | ..... G08G 1/096716 348/135 |
| 6,675,089 B2 | * | 1/2004 | Hirabayashi | ....... G01C 21/3415 701/431 |
| 6,678,613 B2 | * | 1/2004 | Andrews | ................ G01C 21/20 342/357.75 |
| 6,853,849 B1 | * | 2/2005 | Tognazzini | ........... B60W 40/04 340/991 |
| 7,236,173 B2 | * | 6/2007 | Chithambaram | .... G06Q 10/087 345/440 |
| 7,561,065 B2 | * | 7/2009 | Obradovich | ........... G01C 21/20 340/905 |

*Primary Examiner* — Eric Blount
(74) *Attorney, Agent, or Firm* — William H. Bollman

(57) ABSTRACT

The present invention is directed to a method and apparatus for storing, referencing, retrieving, and graphically displaying spatial and non-spatial related information of a mobile computing device, such as a laptop computer or a cellular telephone. The spatial-related information may be obtained by using positioning tracking systems such as a global positioning system, whereas the non-spatial related information may include communication activities associated with the mobile computing device, such as phone calls, e-mails, text messages, pages, etc. The present invention also provides methods and apparatus of sharing event information between mobile communication devices as well as related navigational information for traveling to an event from a real-time position of a mobile communication device.

16 Claims, 18 Drawing Sheets

METHOD AND SYSTEM FOR SAVING AND RETRIEVING SPATIAL RELATED INFORMATION

CROSS-REFERENCE TO RELATED APPLICATIONS

The present invention is a division of U.S. patent application Ser. No. 10/781,087 filed Feb. 17, 2004, which claims the benefit under 35 USC 119(e) of U.S. provisional patent application Ser. No. 60/447,567 filed Feb. 14, 2003, the contents of both which are incorporated by reference herein.

BACKGROUND

1. Field of Invention

The present invention is directed to a navigational method and system for 1). storing spatial and non-spatial related information; 2). referencing or linking spatial and non-spatial related information (i.e., stop points, images, forms, e-mail or instant messages, voice recordings, waypoints, etc.); 3). retrieving both spatial and non-spatial related information; 4), graphically displaying spatial and non-spatial related information in a temporal or indexed format; 5). utilizing spatial and non-spatial related information with a route or trip planner; and 6). allowing the capability to share spatial and non-spatial related information amongst multiple users.

2. Description of the Related Art

Computerized mapping software is achieving widespread use today. Such mapping programs are commonly used to automate tasks of calculating routes, viewing location-specific geographical areas for their spatial content, such as addresses, roadways, rivers, etc., and for the purpose of being used with Global Positioning System (GPS) devices for various applications, such as a personal navigation application. Mapping software programs apply to a wide variety of uses, such as personal navigation, telematics, thematic mapping, resource planning, routing, fleet tracking, safety dispatching (i.e., Police, Fire, and Rescue organizations), and a wide variety of specialized Geographic Information System (GIS) applications, all of which are well known to people skilled in the art.

Real-time communication networks today also provide the ability to transfer, in real-time, voice and data information from various mobile devices, such as wireless phones, telemetry devices, or the like, to a multitude of other devices, either mobile or stationary, all of which are well known to people that are skilled in the art. For example, GPS devices that are connected to a wireless MODEM are able to transfer their position coordinates, such as latitude and longitude, wirelessly to a computer or server for later retrieval or real-time viewing of said information. Current applications that integrate or combine mapping, real-time communication capabilities, and position devices, for various computing devices are well known to people skilled in the art. These applications are referred to by various terminologies, including, but not limited to Automatic Vehicle Location (AVL), Location-Based Services (LBS), Fleet Tracking Systems, etc., all of which are well known to people skilled in the art.

Prior art systems, such as AVL systems, typically involve a positioning device connected to a wireless MODEM sending location information, amongst other telemetry information, at discrete time intervals to a computer for the viewing of said information. This monitoring, or tracking, of real-time location information or of location-history information is sometimes referred to as the breadcrumb trail or history information of the mobile device, since it illustrates the current and/or previous locations that the mobile device has been in space and time. The problem with prior art is that the 'breadcrumb' trail or location history information provides the user with either too much information or not enough. When too much information is present, the user does not realize that such information exists until they request it. Also, it is important to be able to provide a way for a user to a-priori realize that the time range the user is requesting location information for has little or no data present, which prior art systems fail to provide. The prior art systems do not provide a graphical way to maneuver around location history information.

Typically, location history information, or Meta data, has no unique association to other location relevant data, such as a digital photograph that has location information associated with it. Additionally, there is no way for the prior art applications to group raw location data, typically referred to as detailed location data in the art, for the purpose of providing a graphical temporal view, such as a Calendar or Gantt view, for access to various types of Meta data, including location-specific and non-location-specific Meta data.

Thus, a need exits for a method and system that allows the ability to store spatial and non-spatial related Meta data, reference or link spatial and non-spatial related Meta data, while providing a graphical display for viewing spatial and non-spatial related information in a temporal or indexed format, such as a Calendar or Gantt view, and provide a method and system for retrieving both spatial and non-spatial related Meta data. This provides many important benefits for UPS-related devices, such as GPS-enabled wireless cell phones with integrated cameras, that transmit spatial (i.e., location) and non-spatial information (i.e., images, forms, e-mail or instant messages, voice recordings, waypoints, etc.) for the purpose of utilizing Meta information in a powerful graphical application.

SUMMARY OF THE INVENTION

It is an object of the present invention to provide a method and system for storing and retrieving location and/or Meta data, such as stop points, images, forms (i.e., work order, questioners, ratings, etc.), messages (i.e., instant, e-mail, etc.), voice recordings, waypoints, or the like, using a common reference thread, either directly or indirectly, such as presence information that is associated with the said location and/or Meta data for either a single or plurality of users and/or devices. In one embodiment, the thread can be the presence of a user that defines a specified time period. Using this time period range, it is possible to associate and retrieve Meta information, both spatial (i.e., location data) and non-spatial information, contained within this period for either storing or retrieving Meta information. It should be clarified that location data can be classified as Meta data, however since this type of information is particularly unique to this invention, it may be explicitly expressed in some instances throughout this invention. Location data typically refers to in the art, but is not limited to, latitude, longitude, and altitude, and may have additional attributes, such as speed and heading, in addition to various other fields.

It is an object of the present invention to provide a method and system for graphically displaying and associating location and/or Meta data to a common thread, such as presence information, user information, temporal information, calendar information, or the like, that is associated with the said location and/or Meta data for either a single or plurality of users and/or devices. In one embodiment, a presence field associated with a user signifies the status of a user for a specified period of time, such as Available, Busy, Away, En Route, On the Phone, At Home, At Lunch, or the like. This presence could have been set either voluntarily (i.e., user interaction), or involuntary (i.e., autonomously configured) during this specified time period. Within this presence-defined time period, the user could have collected 1,000 GPS points with a GPS receiver, 25 images with a digital camera, 2 voice recordings using a personal recorder, stopped five times, where a stop is typically defined in the art as maintaining a location within the same positional area for at least a minimum amount of time (e.g., 2 minutes or more), and sent and/or received 5 e-mail or instant messages (IM). To retrieve this information at a later time, or even during the current presence and at the current time, instead of the user being required to remember the exact or approximate start and stop time of the presence in which all of this information was collected, the user is able to graphically see the presence range along with high level Meta data in either a calendar, Gantt chart view, or other temporal view. In this embodiment, the 1,000 GPS points need not all be displayed, since a large percentage of this information is redundant information, however the images, voice recordings, stops, and e-mail or IM messages could be graphically displayed in connection with the presence information. In this embodiment, to retrieve this high-level Meta information, the user needs only to graphically view and select the temporal and spatially linked Meta objects to retrieve or access the specific information, such as a particular image and its respective position on a map.

It is an object of the present invention to provide a method and system for retrieving location and/or Meta data from a common thread, such as presence information, user information, temporal information, calendar information, or the like, in conjuncture with a graphical display for either a single or a plurality of users and/or devices. The location and/or Meta data can either reside on a local storage device and/or remotely on either a server storage device (i.e., client-to-server configuration) or remotely on another client storage device (i.e., peer-to-peer configuration). Either all of the location and/or Meta data can be stored locally or a subset of location and/or Meta data can be stored both locally and remotely. In one embodiment, during one hour of a day a user set his presence to En Route. When the new presence is recorded, its time, data information, and spatial (i.e., location) information associated with the presence change are recoded. During that hour, 5 stop states were set and 440 GPS locations were also recorded. In this embodiment, every stop state has spatial information, a time stamp, and a time duration associated with the stop. When the user graphically views this presence, only the presence and the stop states are graphically illustrated, and not the 440 GPS locations, since most of these locations points do not provide immediately necessary information as compared to the location information associated with the stop and presence events.

It is an object of the present invention to provide a method and system for graphically displaying, as in a Calendar, Gantt chart view, or other temporal view, summary information of the location and/or Meta data that is associated with a common thread, such as presence information, user information, temporal information, calendar information, or the like, or a time period that is associated with the said location and/or Meta data for either a single or plurality of users and/or devices. In one embodiment, a calendar view displays the entire month of January. Each day illustrates summary information that is associated with that day for a single or plurality of users and/or devices, and the number of users' viewed and summary information is fully configurable, in various combinations, by the user viewing the calendar view. For example, if the calendar view illustrates a group of 5 users' information, the summary information for a day would illustrate, in this embodiment, the following fields:

Total Number of Users
Total Hours Worked
Total Break Time
Total Number of Stops
Total Stop Time
Total Travel Time
Total Distance Traveled
Total Number of Location Points Recorded
Maximum Speed Traveled In this same embodiment, since each of these fields represent a summary of the Meta data that is associated with all of these users combined, it is possible to determine this summary information by compiling all of the Meta data associated with every user for the time range requested. For example, a day was selected in the previous embodiment; however, in another embodiment, a range of 12 days can be selected to determine over that period the summary information of various Meta fields.

It is an object of the present invention to provide a method and system for providing the capability of reducing 'redundant' location information or summarizing 'detailed' location information using a graphical display in combination with a common thread, such as presence information, user information, temporal information, calendar information, or the like, in conjuncture with a graphical display for either a single or plurality of users and/or devices without reducing the total information content of the data. Detailed location history, redundant or unique, from a visual standpoint, can be overwhelming and not entirely useful when displayed either graphically or in a textual context.

Detailed location history is typically referred in the art as location points, which are not associated with other Meta data, such as a message, image, stop, etc. For example, a GPS receiver can send its position information (i.e., location Meta data) to a server for storage at various intervals, such as an update every second, however most of those location points will be in the same approximate location whether the device is stationary or moving, with or without accounting for GPS error. GPS error, such as Selective Availability (S/A), GPS multipath error, atmospheric error, datum error, ephemeris error, or other types of error that bias the actual location of the GPS receiver, is typically small due to advances in GPS receiver designs and implementations, which is sometimes referred to in the art as assisted GPS or A-GPS.

Displaying a summary of the number of location points for a specific range of time or in groups of location points in either a Calendar or Gantt chart view, can provide a powerful way to visualize the important Meta data, such as stop locations, images, messages, etc., without obfuscating or concealing the actual information contained within the time range of desired information. This invention provides the capability to display the summary details of Meta data, such as location information, to the user without reducing the total information content to the user. In many ways the total information content to the user is increased, since the user can better utilize and understand the overall data. The extraneous or redundant Meta data can reside on a local storage device and/or remotely on either a server storage device (i.e., client-to-server configuration) or remotely on another client storage device (i.e., peer-to-peer configuration). In one embodiment, for a given presence range, a user collected 1000 location points, had 5 stop events, and took 3 images with a digital camera. The high-level Meta data associated and displayed in either a calendar view or Gantt view would be the start and end of the presence events and their respected location points, the 5 stop events and 3 images in addition to their respected location points (i.e., a total of 10 location points including the presence events). The detailed 1000 location points need not be displayed initially, but only the summary of its information, such as the total number of location points collected, are displayed since a high degree of the useful information conveyed can be illustrated with the high-level Meta data (i.e., presence events, stops, images, and respective location points).

The detailed 1000 location points can later be retrieved, in this embodiment, from the online server if at all necessary. In another embodiment, the 1000 location points can be further decimated using a filtering process to combine location points into a similar grouping. For example, the 5 stops events that were recorded are associated with at least a single or, as in this example, many location points. This invention allows only those detailed location points that are associated with the specific Meta data, such as a specific or group of stop events, which have a respective time duration (i.e., similar to a presence duration) or other Meta data that has a temporal range, to be retrieved.

It is another object of the present invention to provide a method and system for providing a graphical display, including, but not limited to a Calendar view and/or Gantt view, of location and/or Meta data in a temporal format in combination with a common thread, such as presence information, user information, temporal information, calendar information, or the like, for either a single or plurality of users and/or devices.

It is another object of the present invention to provide a method and system for providing a graphical display of summary information summarizing detailed location and/or Meta data for a specific time period or for a provided common thread that indirectly references a time period, such as presence information that is associated with said location and/or Meta data, for either a single or plurality of users and/or devices. In one embodiment, a stop event or presence event indirectly references a time period that provides an indirect thread for referencing a selection of Meta data. In another embodiment, in a Calendar view, selecting a day or group of days can indirectly reference a selection of Meta data, associated for a user/device or group of users/devices, that are contained within the selected time period. In another embodiment, the summarized location Meta data, such as "stops", will also display, when available, the nearby Point of Interest (POI) (i.e., restaurants, schools, parks), geographical areas, user contact list, or the like, that the location Meta data was nearest, thus providing a more detailed report of the recorded Meta data.

It is another object of the present invention to provide a method and system for providing the capability of sending, saving to a file, e-mailing, or the like, location and/or Meta data to a single or plurality of users using a common thread, such as presence information, user information, temporal information, calendar information, or the like, using a graphical display, such as a Calendar or Gantt chart view. By sending this common thread to a single or plurality of users, the sender grants the recipients the same or limited access ("use rights"), such as for a specified or unlimited time period, to information associated with this common thread. The actual information content need not be all transferred at once, since only the common thread and accompanying security information are necessary to provide access to all of the Meta data content associated with said common thread. This associated Meta data can be stored either on the server (i.e., any device other than the originating client that can serve the information to the recipients) or on the originating client for later access and retrieval, based on the common thread sent to the recipients and the use rights associated with the transfer. The use rights associated with the transfer can limit the time allowed for the recipients to view the Meta data, or provide the sending party the ability to revoke the granted access at any given time.

In another embodiment, a user would save a presence thread to a file that references various Meta data on a server. The user would theme-mail the said file to another user. This action is similar to sending the file directly to the destination user.

It is yet another object of the present invention to provide a method and system for providing the ability to retrieve location and/or Meta data using a common thread, such as presence information, user information, temporal information, calendar information, or the like, for either a single or plurality of users and/or devices, for the purpose of using the information towards planning a route. The location and/or Meta data, summary or detailed, can be added as origin, stop, via, or destination points.

Time duration information for Meta data can also be included for planning a route. In one embodiment, a presence that has two stops associated with it is added to a route planner. The presence start and end times and locations are added as the route origin and route destination (i.e., end point) in the route planner, and the two associated stops are added in between the origin and destination points. Each origin, stop, and destination point includes the location and duration that is associated with each point derived from the locations contained within the time period specified by this said presence.

This provides a more realistic route report, since the calculated direction information and total time required to travel this route will be properly conveyed using this information, which may differ from the actual total, time period of the presence, since the calculated route is optimized using the best possible route (i.e., shortest distance, shortest time, etc.). This information can be further supplemented if detailed location information is added to the route planner, since the actual route that was traveled during this presence period can be better represented and reproduced given more information. However, using this detailed location information does not necessarily provide an optimized route, since the actual route traveled may not equal the optimized route calculated using only the origin, destination (i.e., route end point), and stop points along the route as opposed to including detailed location points.

It is yet another object of the present invention to provide a method and system for providing the ability to synchronize location and/or Meta data using a common thread, such as presence information, user information, temporal information, calendar information, or the like, for either a single or plurality of users and/or devices, from an online server to a local or remote computing device. This information is originally stored on a server that is connected to the Internet, Intranet, or Extranet, and accessible by the end client, either via a wired or wireless connection to the Internet, Intranet, or Extranet, for the purpose of synchronizing a subset or the entire set of location and/or Meta data. This allows the mirroring of the location and/or Meta data stored on the server onto to the local or remote computing device.

The data can be removed or left intact on the originating server after the synchronization process has been completed.

It is still another object of the presence invention to provide a method and system for allowing the synchronization of location and/or Meta from an online server to a local or remote computing device while the local application and/or OS is in an idle state or upon a user-initiated, a-priori scheduled request, or any other external (i.e., peripherals) or internal (i.e., computing events) notifications event.

DETAILED DESCRIPTION OF THE EMBODIMENT

This present invention relates to a method and system for 1). storing spatial and non-spatial related Meta information, 2). referencing or linking spatial and non-spatial related Meta information (i.e., stop points, images, forms, e-mail or instant messages, voice recordings, waypoints, etc.), 3), retrieving both spatial and non-spatial related Meta information, 4). graphically displaying spatial and non-spatial related information in a temporal or indexed format, such as a calendar view (i.e., month, week, day, etc.) or Gantt view, 5). utilizing spatial and non-spatial related Meta information with a route or trip planner, and 6). allowing the capability to share spatial and non-spatial related Meta information. The details of the present invention will now be described with references to FIGS. 1-17.

Meta information is well known to a person skilled in the art, and typically refers to the content and location of (environmental) data and information holdings. Meta data, or information, is the high-level "overview" or informational abstract that summarizes a particular data set or institute that can provide access to data. For this invention, it refers to, but is not limited to:

1. Location Data (i.e., GPS information)
2. Presence (i.e., At Home, En Route, Offline, etc.)
3. Stop Events
4. Images
5. Forms (i.e., work order, questioners, ratings, etc.)
6. Voice Recordings
7. Waypoints
8. Notifications
a. Excessive Speed
b. Geofenced Event
c. Low Battery Event
d. Out of Cell Coverage The present invention may be embodied in a mapping and real-time communication application, such as the "Map Messenger™" application, owned and licensed by Networks In Motion, Inc. of Aliso Viejo, Calif.

Figure 1:
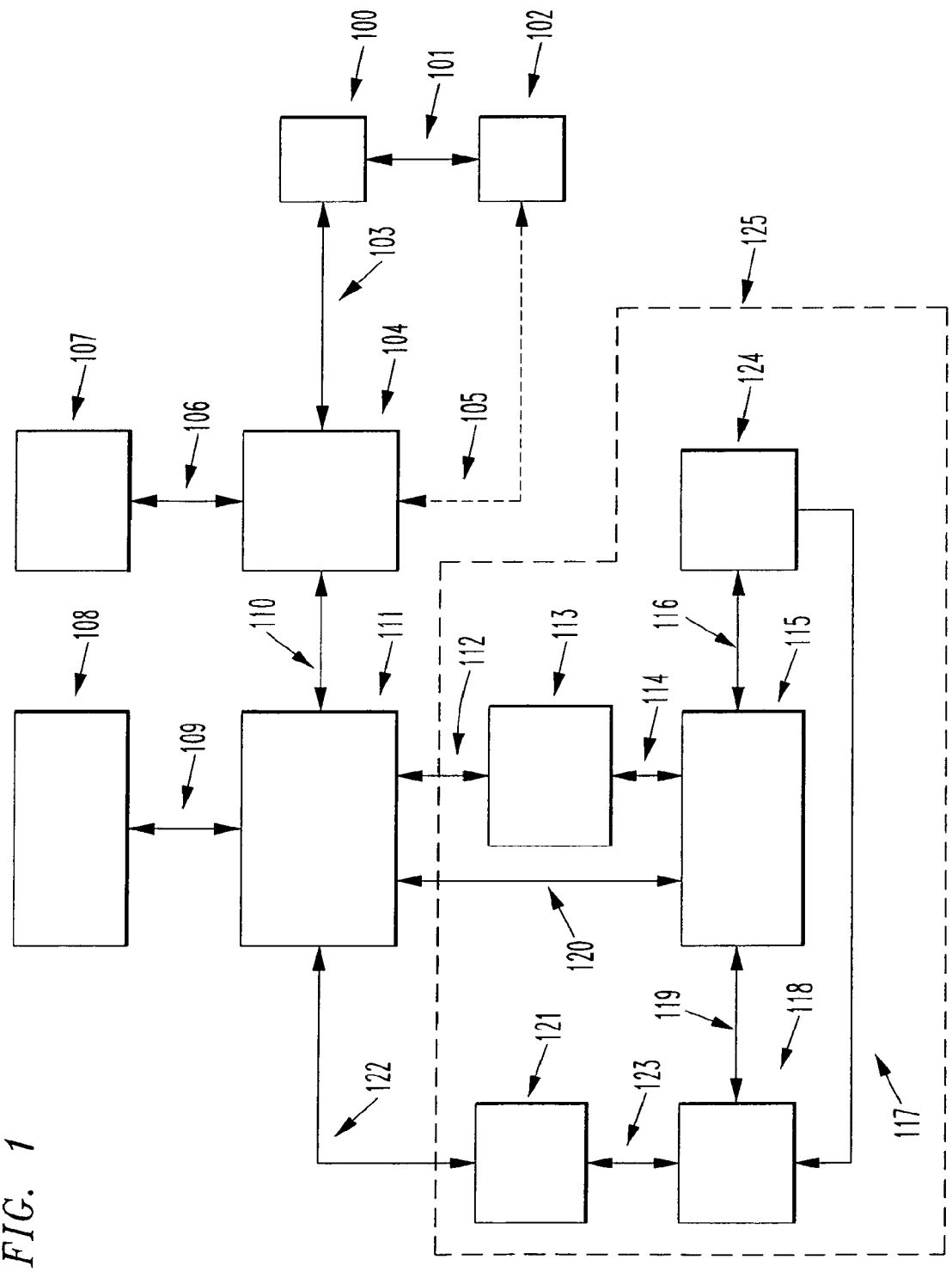
FIG. 1 illustrates the environment of a preferred embodiment of the present invention for providing a communication channel between various different computing devices for this invention.
Figure 1A:
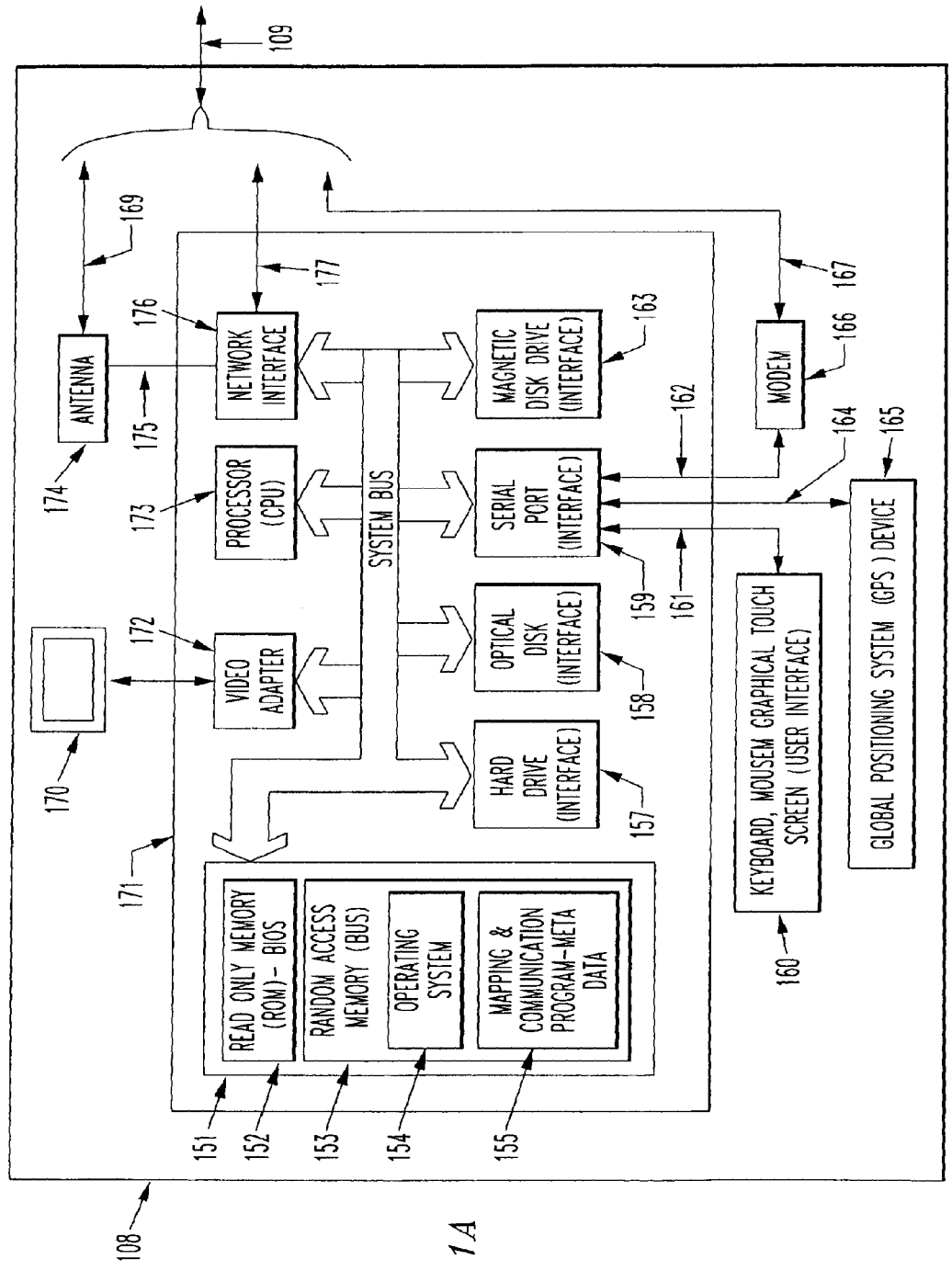
FIG. 1A illustrates a block diagram of a computer that provides the exemplary operating environment for the preferred embodiment of the present invention.

FIG. 1 and FIG. 1A illustrates a high-level diagram of one embodiment that is a suitable computing and networking environment in which the invention may be implemented. The invention will be described in the general context of an application that executes on an operating system in conjunction with a personal computer or server, but those skilled in the art will realize that this invention may also be implemented in combination with other program modules. Program modules typically include routines, programs, data structures, etc. that perform particular tasks or implement particular abstract data types. This invention is not limited to a typical personal computer, but may also be utilized with other computing systems, such as handheld or mobile devices, mobile laptop computers, wireless phones, in-vehicle navigation systems, programmable consumer electronics, mainframe computers, distributed computer systems, etc., and the like.

FIG. 1 illustrates a network server and client system for sending and receiving packets of data information, such as GPS location updates or other Meta data such as stop points, images, messages, or the like, and includes a typical mobile positioning device, such as a wireless device, but those skilled in the art will appreciate that this may also include an optical or wired mobile device. The mobile device 100 includes or is attached via a connection interface 101, to a positioning device 102, such as a GPS receiver. In some embodiments, the position device can receive position-aiding information by means of a wireless connection, either a separate wireless connection 105 or the primary wireless connection 103 that the wireless device uses to send data wirelessly to the wireless base station 104.

The wireless base station 104 provides the interface, typically a connection 110 to the Internet, Intranet, or Extranet 11, but those skilled in the art will appreciate that the connection may include a wireless communication network, such as a wireless telephone network. Additionally, other mobile computing devices 107 can also be supported by the wireless base station 104 through various types of connections 106, such as a TDMA, CDMA, or the like. In this embodiment, the local computing device where the graphical display of Meta data is shown may either be a stationary 108 or mobile computing device 107. In this embodiment, a server system 125 consists of a XML router 115 for routing the Meta data, a position device server gateway or connection server 113 that connects to various mobile devices, a database 124, with server connection 116, for storing the Meta information, a web page server client 118 for providing useful HTML capability, such as changing a roster list of users that can send and receive various types of Meta data, and a web server 121 for delivering roster list information directly to the end client in an HTML format. In this embodiment, the various primary architectures for routing Meta data include:
1. Local Display of Meta Data (i.e., no Routing of Meta Data)
2. Peer-to-Peer
3. Peer-to-Server, then Server-to-Peer
4. Peer-to-Local Storage Device, then Local Storage Device (i.e., Peer-to-Peer)
5. Peer-to-Server Storage Device, then Local Storage Device (i.e., Peer-to-Server, then to Peer)

The first architecture should not send Meta data to an online server for storage, involving a later retrieval of information from the same or different device or client, or directly to other computing devices (i.e., clients), but only displays them on the mobile computing device's 100 or stationary computing device's 108 local display. The invention provides the means to collect and process this Meta data without the need for a connection to the Internet, Intranet, or Extranet.

The second routing architecture is a peer-to-peer (P2P) model. In this embodiment, a P2P architecture preferably includes a mobile wireless device 100 that obtains its Meta data, such as location updates, through various interfaces. In this embodiment, this interface 101 is connected to a positioning device 102, but could include a digital camera 102 with either a Bluetooth 101 or USB 101 interface, all which are known to those skilled in the art. The Meta data is routed from the mobile wireless device 100, through the wireless connection 103 to the wireless base station 104. The wireless base station 104 then routes, typically using an IP (i.e., TCP or UDP) protocol, to the appropriate other device, which is either a mobile device 107 connected 106 using the same or different wireless base station 104, or is a stationary computing device 108, which is typically connected 109 to the Internet, or the like. The remote peer can also be a server system 125 that would receive, calculate, and store and/or display the Meta data.

The third route architecture is a peer-to-server (P2S), then a server-to-peer (S2P) model. In one embodiment, a P2S architecture is similar to the P2P architecture, except that the end device is a server. In this embodiment, the wireless mobile device 100 obtains its Meta information, such as GPS information, from a positioning device 102. The discrete location information is then transmitted 103 to the wireless base station 104 that is connected 110 to the Internet 111. The server system's 125 positioning device gateway 113 is also connected 112 to the Internet 111, and is capable of receiving location update packets from the mobile wireless device sending said packets. Thus the mobile wireless device 100 is capable of transmitting its discrete location update information to the server system (i.e., P2S). The same, or another client, such as a stationary computing device 108 (i.e., a personal computer) is also connected 109 to the Internet Ill. The stationary computing device 108 has a connection to the server system 125 by means of the XML Router 115 that is also connected to the Internet 111.

When discrete location packets are sent by the mobile wireless device 100, they arrive at the server system's 125 positioning device gateway 113, and are then routed 114 to the XML Router 115 which then forwards the location packets to the stationary computing device 108 via the Internet 111 and the XML Router's Internet connection 120. The discrete location packets are then sent to the stationary computing device 108 by means of a dedicated Internet connection 109, which is the S2P part of the third routing architecture. In another embodiment, the peer device in the S2P portion of the model could be a different mobile device 107, or even the same mobile device 100 that is transmitting the location updates.

It should be noted that Meta location data information could also be obtained by means of a server connected to the mobile wireless device 100 at its location, thus sending the location update information directly to the Internet 111, or the like, and to the server system 125. This scenario also applies for all of the other architectures of routing location update information. As it will be appreciated to those skilled in the art, the position information obtained for calculating the discrete location information can vary across networks that use various technology implementations, such as E-OTD, TOA, AOA, gpsOne from Qualcomm, SnapTrack Servers, Assisted-GPS, etc., which are known to those skilled in the art.

Another architecture consists of a mobile device (i.e., where the mobile device does not need to be a wireless device, such as a non-wireless Personal Digital Assistant (PDA)) which captures the Meta information, such as location information, from a positioning device and stores it locally, such as in its hard disk drive, optical drive, local memory (i.e., Flash, SDRAM, etc.), floppy disk drive, etc., The mobile device can then transfer its stored Meta information to another computing device, either stationary or mobile, using various methods. These transfer methods include, but are not limited to, the use of an infrared connection, floppy disk, Bluetooth connection, removable hard disk drive, or the like. This architecture is denoted as a peer-to-peer local (i.e., storage device) transfer, followed by a peer-to-peer transfer (P2L-P2P).

A similar architecture comprises of a mobile device that captures Meta information, such as location history information, and stores it locally as previously mentioned. At a later point in time, the Meta information is transferred to the online server system 125 through the previously mentioned methods, or the like. Once the data is stored on the server, the S2P model can be used to retrieve the stored information. Meta information can be stored completely on the server and by request be transferred to an end peer client, such as a stationary computing device 108 or a mobile computing device 107 using either a wireless 106 or dedicated landline connection, such as an Ethernet cable.

As illustrated in FIG. 1, the end clients, such as the stationary computing device 108 or mobile computing device 107, can directly interact with each other through the provided system, or directly with the server systems 125. For instance, a personal computer 108 can request to view Meta information through a web server application 118 that interfaces 117 & 119 to the server system's 125 database 124. The web server application 118 can display the Meta information, such as in a Calendar or Gantt view, to the stationary computing device 108 using its interface 123 to the web server 121, the web server's connection 122 to the Internet 111, and a dedicated connection 109 from the Internet 111 to the stationary computing device 108. The Meta information, in this embodiment, is compiled on the server system 125 in the web server client application 118 and displayed using the web server 121 to the end client on the stationary computing device 108 in various graphical displays, such as a web Calendar or Gantt view. The calculation or compilation of the Meta is not done on the end client 108, but rather on the web page server client 118 and is displayed using the web server 121.

In another embodiment, the Meta information, such as location data, is transferred from the server system 125 to the end client 108 by the primary means of the Internet 111 and the direct connections that interface 120, 122 to the Internet with the end client 108 and XML Router 115. The XML Router 115 routes the Meta information to the end client 108 from its storage place in the database 124 contained in the online server system 125. The Meta information is then calculated and displayed on the end client 108. The online server system 125 is displayed as a centralized server system, but can also embody a distributed server system, which is well known to those skilled in the art.

FIG. 1A includes a typical personal computer 150, that includes a central processing unit (CPU) 173, video adapter 172, hard disk drive 157, optical disk 158, serial port 159, magnetic disk ° drive 163, system bus 156, and network interface 176→177 & 167 & 169→109. The hard disk drive 157 typically refers to a local non-volatile storage system for storing large amounts of data, such as map data or Meta data. The optical disk 158 typically refers to a CD-ROM disk used for storing read-only data, such as an installation program. The serial port interface 159 is typically used to connect 161 the computer 150 to external devices 160, such as a keyboard, mouse, and graphical touch screen interface, and also can connect 164 to positioning devices 165, such as a GPS receiver. The keyboard and mouse 160, amongst other input devices 165, enable users to input information into the computer 150. The connection 161 & 164 cables can include a serial cable or universal serial bus (USB) cable.

Other input devices, that are not shown, may include a joystick, scanner, camera, microphone, or the like. The magnetic disk drive 163 is typically used to store small amounts data, in comparison to a hard 157 or optical 158 disk drive, and typically lacks the data transfer rates of those other storage drives, but it enables both readable and writable capability. The hard disk drive 157, optical disk drive 158, serial port interface 159, and magnetic disk drive 163 are all connected to the main system bus 156 of the computer 150 for transferring data. A monitor 170 or other type of display device, such as a LCD display, is connected 171 to the computer system's 150 video adapter 172, which is connected to the system bus 156. Additional peripheral output devices, which are not included in this embodiment, such as a printer, speaker, etc., can also be connected to a personal computer 150. The system bus 156 also connects to the network interface 176, central processing unit (CPU) 173, and system memory 151. The system memory 151 contains both random access memory (RAM) 153, and read only memory (ROM) 152, that typically consists of the BIOS (Basic Input/Output System) of the computer, necessary for containing basic routines that enable the transfer of information between elements within the personal computer 150. The RAM 153 stores a number of program modules, such as the Mapping and Communication Program, including Map Data and various other types of Meta Data, 155, and the Operating System 154 of the personal computing device 150 or personal computer 150. One example of such a program module 155 would be the "Map Messenger" program previously mentioned.

A network interface 176, shown in FIG. 1A, illustrates typically how data is transferred between other computing devices 107 & 100 and a computer 108 or 150 through an Internet, Intranet, or Extranet network 111 (all of the networks being well understood by one skilled in the art as to their characteristics and data transfer capabilities).

Additionally, this connection 167 can be implemented using a MODEM 166 that is connected 162 to the personal computing device 150 typically by using the serial port interface 159. In one embodiment, a computer 150 can connect 109 to a network 111, such as an Internet, Intranet, or Extranet, by various means that are well known in the art, such as by using a Digital Subscriber Line (DSL) cable. Additionally, a computing device can also connect to the Internet 111 by means of a wireless connection 106 to a wireless base station 104, where the antenna 174 is coupled 175 to the network interface 176 of the computing device or personal computer 150.

The wireless base station 104 is also connected 110 to the Internet, Intranet, or Extranet network 111 by some means well known to people skilled in the art, such as a T1 connection. A wireless base station 104 can represent a local area network (LAN) base station, such as that used in an office building, or a wide area network (WAN) base station, such as that used in a cellular, Personal Communications System (PCS), 3G, or the like, wireless phone network.

The Internet, Intranet, or Extranet 111 allows for connection 109 & 110 to other personal computing devices 108 & 107, such as a wireless phone, hand-held device, in-vehicle navigation (i.e., telematics device), or the like. The Internet, Intranet, or Extranet 111 is also connected 112 & 120 & 122 to a central or distributed server system 125, however this connection is not necessary in a peer-to-peer environment. This server system 125 can contain a real-time communication server 115, a web server 121, and a database 124 where Meta information can be stored and retrieved.

In order to describe the preferred embodiment of how this invention works, it is important to illustrate how prior art systems interpret Meta data, such as detailed location data. As a person skilled in the art will appreciate, location data, such as from various fleet systems, is sent to the server using an ASP (Application Service Provider) model, where a server provides the means to collect location data from various GPS wireless clients. There are various modes by which GPS clients transmit their GPS data, such as:

1. Delta-T Mode
2. Delta-X Mode
3. Query Mode
4. Geofenced Mode

These various modes describe a certain type of behavior that the GPS client outputs. For example, Delta-T Mode illustrates that for every specified T seconds, a GPS location will be calculated and sent to the server. The Delta-X Mode illustrates that for a given X distance, a GPS location will be calculated and sent to the server. The Query Mode illustrates that a web, desktop, server, mobile client, or the like, can request in an ad-hoc manner the location information for the GPS client, where the GAS client would calculate a GPS location fix and send it to the server for storage and most likely to the requesting client. The Geofenced Mode illustrates that for any predefined boundaries that are crossed, a GAS position is to be calculated and sent to the server.

Figure 2:
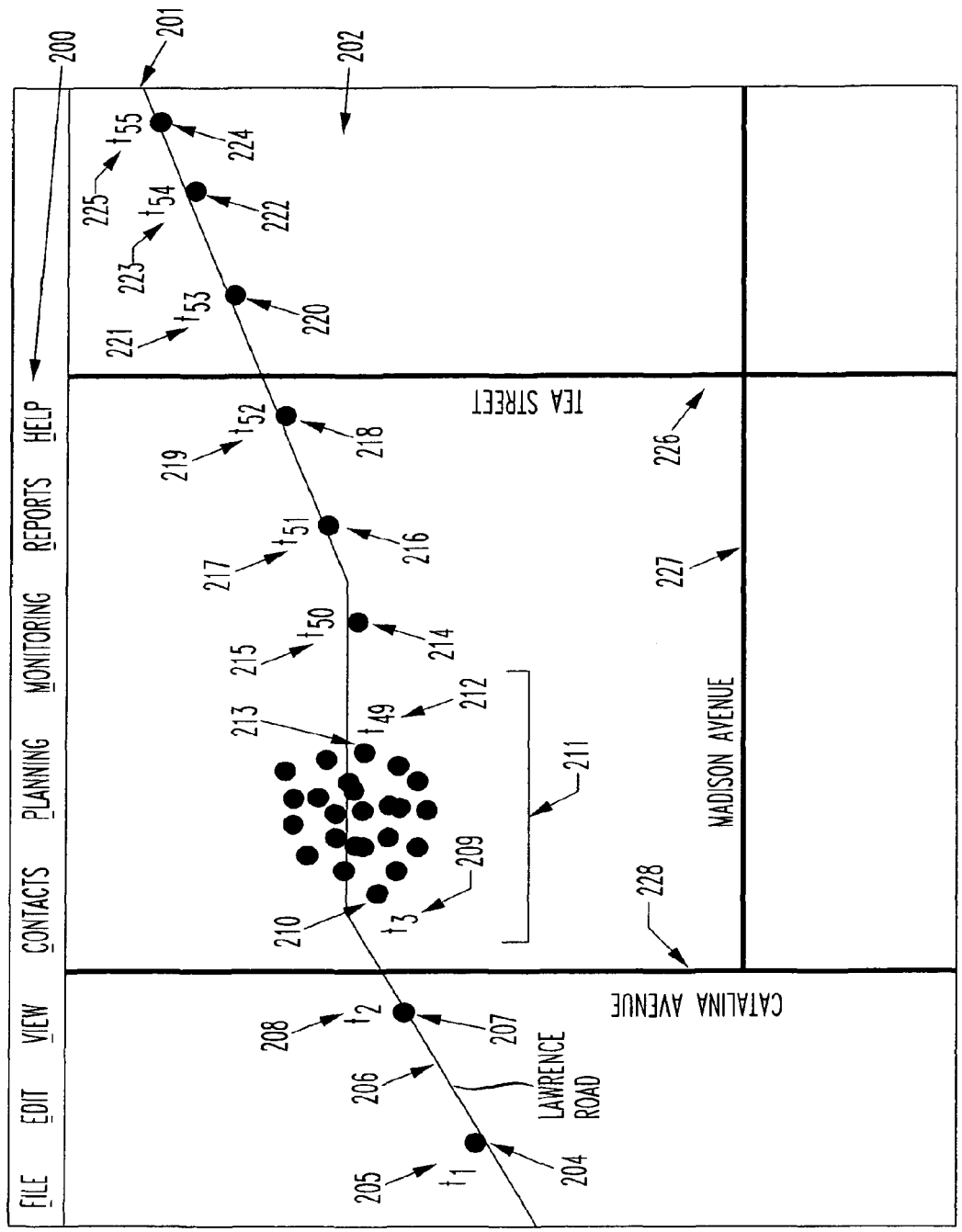
FIG. 2 illustrates one aspect of the present invention showing how a collection of real-time location data can be spatially accumulated while a user/device is on a trip and making a stop.

As illustrated in FIG. 2, a typical Delta-T Mode is used to send a position update to the server every T seconds, where T is denoted as 60 seconds in this figure. Note that 1 minute $t_2$ 208–$t_1$ 205. FIG. 2. illustrates a graphical map program 201 with a menu bar 200 for controlling various functions of the application 201 and a map display 202 for displaying spatial information, such as GPS position fixes and geographical elements, such as streets 228 & 227,& 226 & 206. It should be noted that the GPS receiver sent these locations while the user carried the GAS receiver while en route 204 & 207, at a delivery stop 211, and continuing en route 214 & 216 & 218 & 220 & 222 & 224 as illustrated by the user's breadcrumb trail. The total stop time that the user was at the delivery stop is defined as $t_{49}$ 212 & 213–$t_3$ 209 & 210, or 46 minutes. Then the user continued on a route for an additional 6 minutes (i.e., $t_{50}$ 215, $t_{51}$ 217, $t_{52}$ 219, t53 221, $t_{54}$ 223, and $t_{55}$ 225, where 6 minutes=$t_{50}$ 215–$t_{55}$ 225). It should be noted that a culmination of redundant location points 211 were accumulated while the user was approximately in the same position during their stop of 46 minutes.

Figure 3:
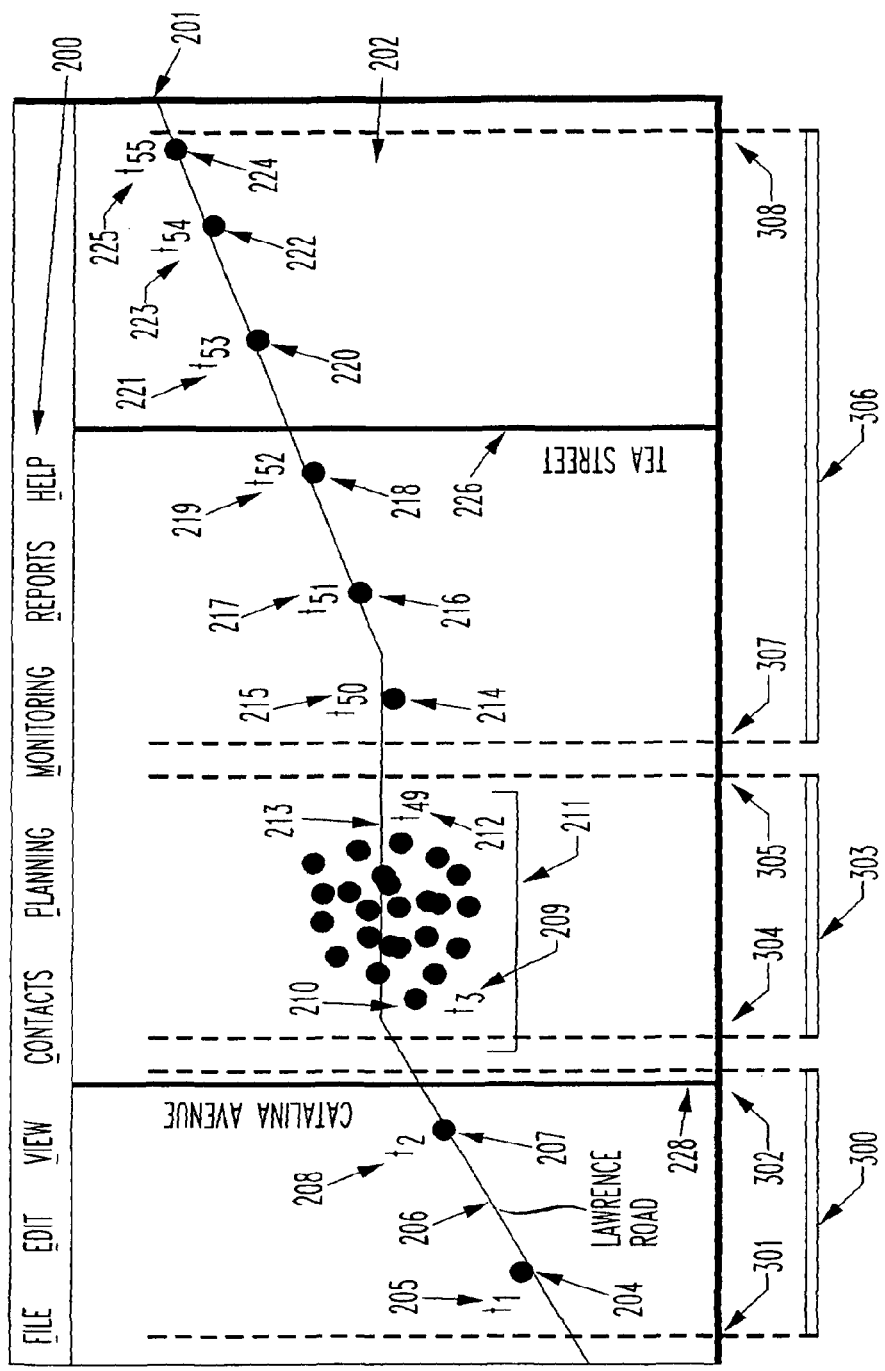
FIG. 3 illustrates another aspect of the present invention for graphically separating different portions of the trip (i.e., stopped vs. en route)

As illustrated in FIG. 3, it is possible to categorize the user's trip as first an en route presence state 300 as denoted between the two boundaries 301 & 302. The second part of the trip can be illustrated as a stop 303 and denoted between the two boundaries 304 & 305. The last part of the trip can be illustrated as an en route presence state 306 and denoted between the two boundaries 307 & 308.

Figure 4:
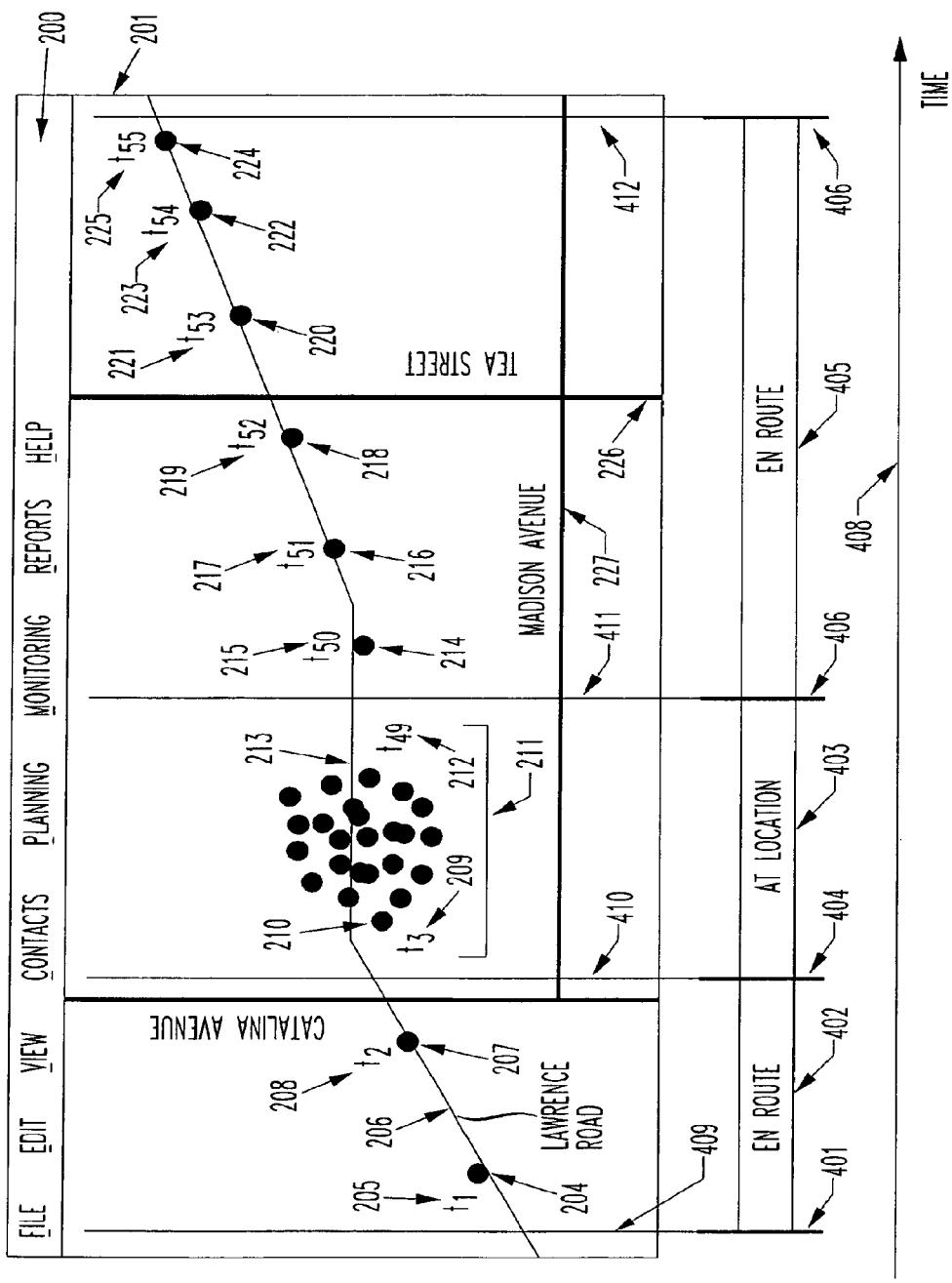
FIG. 4 illustrates another aspect of the present invention for typical presence states and how these presence states would ideally be associated with the location data for a trip.

The user's trip can further be illustrated in a simpler way if presence states are associated with the various segments of the user's trip. For example, as shown in FIG. 4, the first part of the trip can be illustrated as an "En Route" presence 402, bounded by the presence state's temporal 408 boundaries 401, 409 & 404, 410. The second part of the trip can be defined as an "At Location" presence 403, bounded by the presence temporal 408 boundaries 404, 410 & 406, 411. The final part of the displayed to trip 201 can be illustrated as an "En Route" presence 405, bounded by the presence temporal 408 boundaries 406,411 & 407,412. An object of this invention, as those skilled in the art will appreciate, is that the presence states 402 & 403 & 405 can be associated or bounded by a common thread to the respective location points contained with the presence state's respective temporal 408 boundaries. Thus, in order to reference all of the points at the stop location 211, it is only necessary to visualize or reference the "At Location" presence, and not the entire collection of 47 location points 211.

Figure 5:
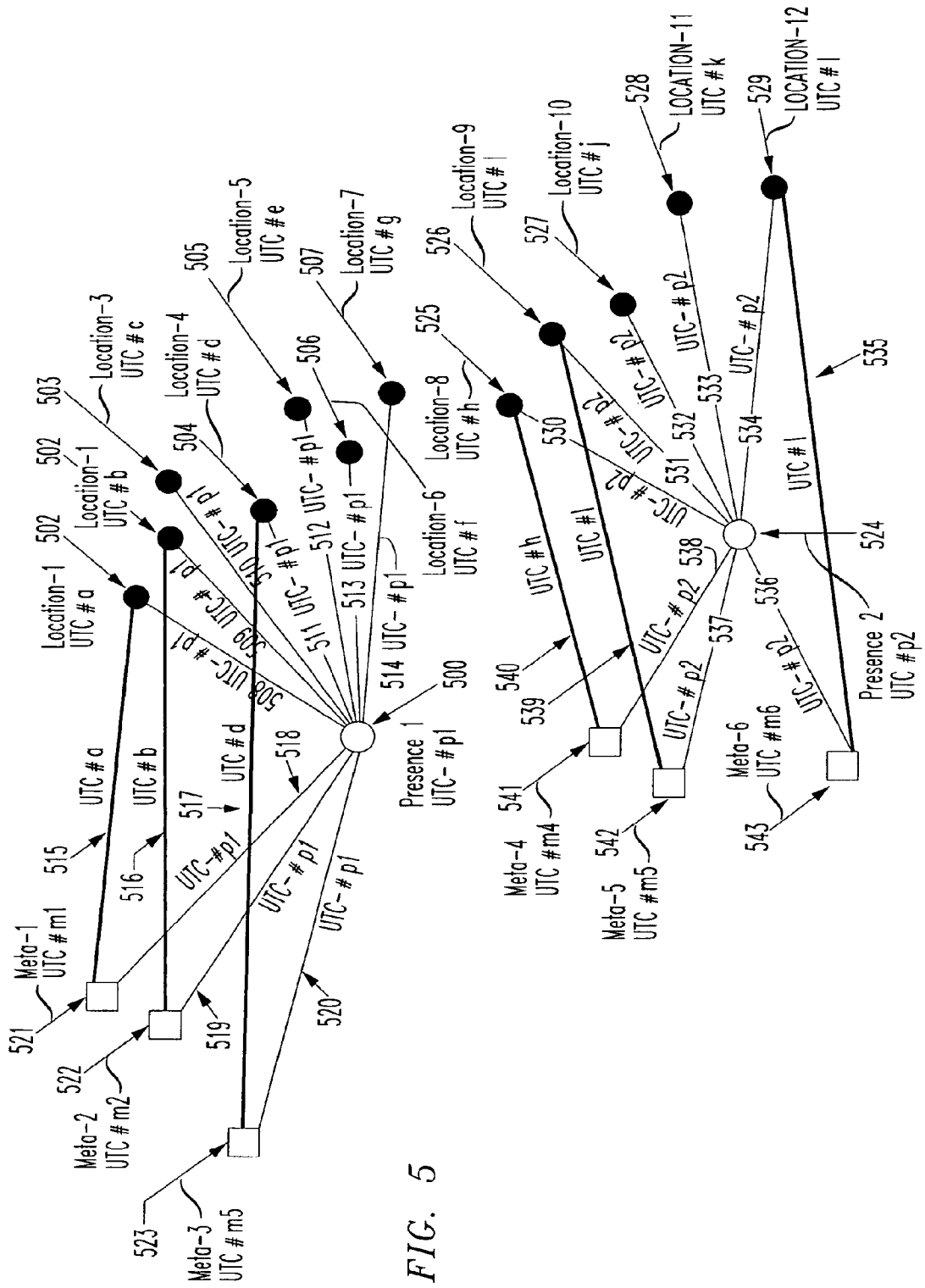
FIG. 5 is a pictorial example of another embodiment of the present invention for conveying how a common thread or groups of threads is implemented to correlate various Meta data with one another.

There are various implementations to provide a common thread across various Meta information, either directly, such as direct threads or links, or indirectly, such as using a temporal range. FIG. 5 illustrates a method for directly referencing Meta data with other Meta data. In one embodiment, a wireless client 100 connected to a position device 102 and other peripherals, such as a digital camera, can send out location updates at either a predefined interval of time (i.e., Delta-T Mode), predefined interval of distance (i.e., Delta-X Mode), or by other output modes as known to those skilled in the art. In this embodiment, when a presence state is changed 500, it has some unique thread ID, such as the UTC time (i.e., "Coordinated Universal Time", Zulu, or sometimes referred to as Greenwich Mean Time, GMT). This common unique thread (i.e., p1) that is related to this presence 500 is unique in time for this particular client that also has a unique user ID. Therefore, every location point 501 & 502 & 503 & 504 & 505 & 506 & 507 that is sent, stored, or otherwise created by the wireless GPS-enabled client 100 is associated with this unique user ID and unique thread for referencing later. Thus, the presence 500 can be referenced to all of these location points 501 & 502 & 503 & 504 & 505 & 506 & 507 directly via this unique ID 508 & 509 & 511 & 512 & 513 & 514. Additionally, any Meta data that the client 100 stores, transmits, or otherwise sends can also be associated using this common UTC thread ID and User ID, or combined to become a common thread between each other. For example, Meta-1 521, Meta-2 522, and Meta-3 523 are defined as two stop points and an image, respectively. Since each Meta information 521 & 522 & 523 can also have Meta location information associated with it 501 & 502 & 504, it is possible to reference these primary Meta information using a common thread 518 & 519 & 520 & 508 & 509 & 511, and a common thread between each Meta information and Meta location information 515 & 516 & 517, where the common thread consists of the User ID for the client 100 and the UTC time associated with the presence that links all Meta data with the presence information, since the presence field encompasses all of the Meta data within the specified period of time, and the Meta data can reference each other using a UTC time relative to the Meta location data.

FIG. 5 also illustrates how two unique presence states 500 & 524, which are preferably mutually exclusive in time for a particular user ID or client/device, can have multiple Meta information associated with each of the presence states 500 & 524. It should be noted that the Meta data that is associated with each unique presence state for a particular user ID cannot be linked with two or more presence states 500 & 524, since presence states do not overlap in time (i.e., mutually independent). For example, the second presence state 524 has multiple Meta location information 525 & 526 & 527 & 528 & 529 associated 530 & 531 & 532 & 533 & 534 with it and multiple other Meta information associated with it 541 & 542 & 543, such as a voice recording 541, message 542, and a waypoint 543, respectively, where each of these Meta information is directly referenced 538 & 537 & 536 to the second presence state 524.

The Meta information associated with the second presence state 524 should not be referenced directly to the first presence state 500, however they may have an indirect loose reference, such as having the same GPS coordinates on the Earth, etc. However, the Meta information that is associated with the second presence state 524 can reference other Meta information that is associated with the second presence state 524 directly using a common thread 540 & 539 & 535, such as a location point 526 that is connected with a point in space where a message 542 was sent.

Figure 6:
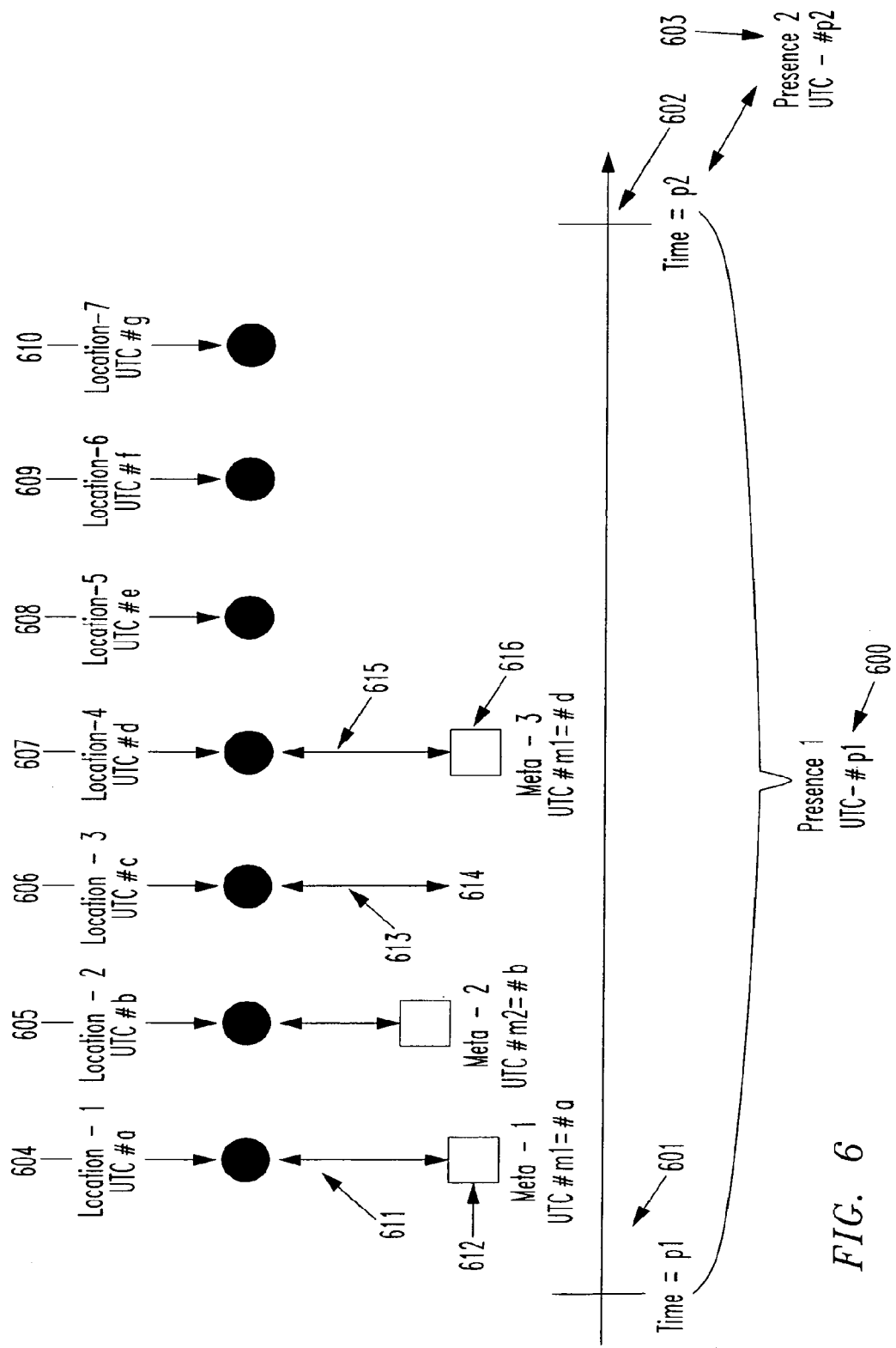
FIG. 6 is a pictorial example of another embodiment of the present invention for associating various types of Meta data with other types of Meta data using temporal threads.

In another embodiment, FIG. 6 illustrates how Meta information can be associated indirectly using temporal boundaries. For example, the Meta location data 604 & 605 & 606 & 607 & 608 & 609 & 610 can be sent to the server from a wireless GPS-enabled client 100. This Meta location data 604 & 605 & 606 & 607 & 608 & 609 & 610 is mutually exclusive to other location data, however other Meta data, such as a stop condition 612, e-mail message 614, and a digital image 616 that overlap with Meta location data (i.e., you can take an photograph and associate the image with a position on the Earth simultaneously) can be obtained. These various types of Meta data (i.e., location 604 & 605 & 606 & 607 & 608 & 609 & 610 and other Meta data 612 & 614 & 616) can be referenced directly using a common thread between each other 611 & 613 & 615. All of the Meta data has a temporal attribute associated with it. In this embodiment, the presence 600 illustrated in FIG. 6 has a start time 601 and an end time 602, where the end time is the start time of the next presence state 603. All of the Meta data contained within the period between the start time 601 of the presence state 600 and end time 602 are indirectly referenced with the said presence 600. This is implied, since presence states do not overlap in time for users and/or devices (i.e., unique user ID's). Thus, it is possible to retrieve all of the Meta data associated with the presence 600 by only referencing the presence's information. The method and system will indirectly reference the presence state's 600 start 601 and end 602 times to query all of the Meta data (i.e., location 604 & 605 & 606 & 607 & 608 & 609 & 610 and other Meta data 612 & 614 & 616) contained within the said time period.

Figure 7:
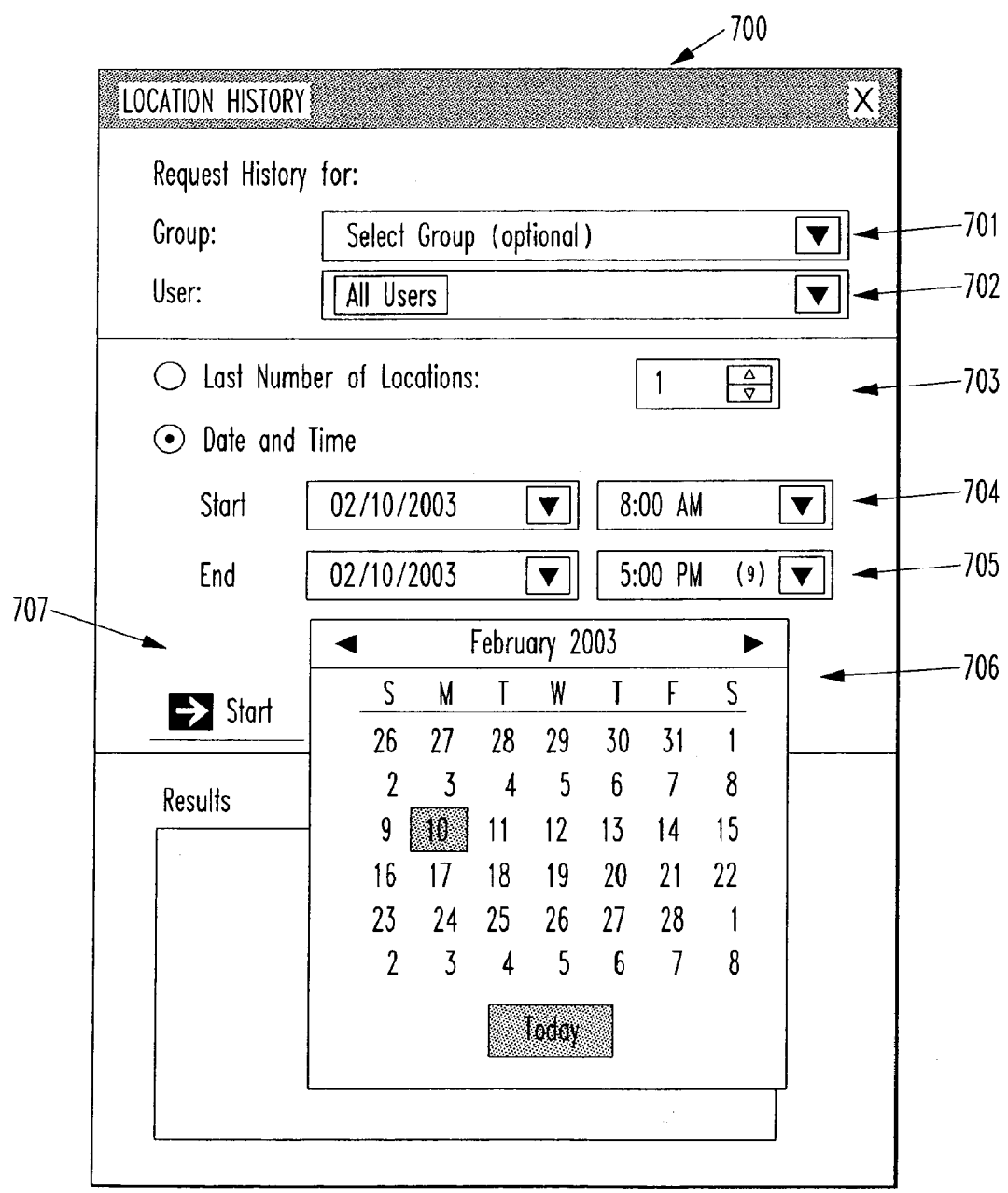
FIG. 7 illustrates a method for graphically retrieving location-related data, such as the location history trial, or breadcrumb trail, in accordance with the present invention.
Figure 8:
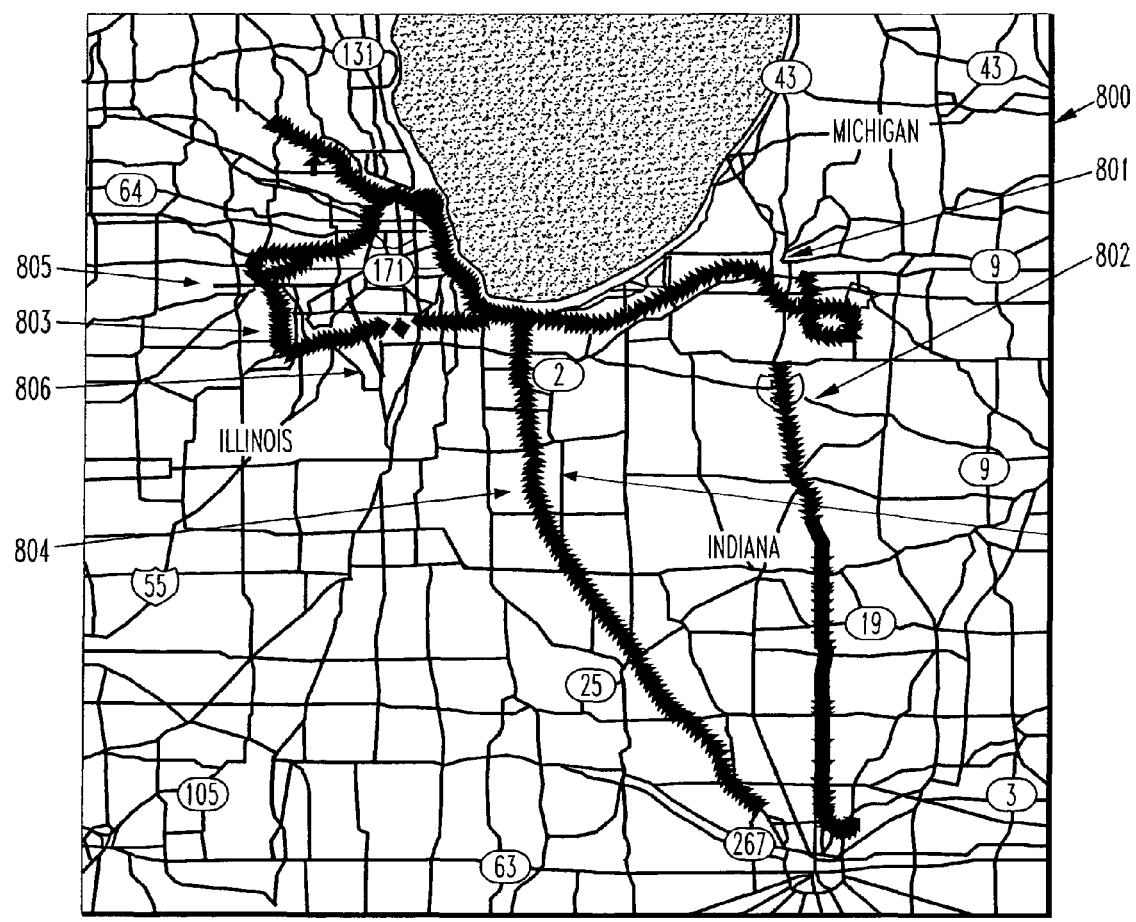
FIG. 8 illustrates an actual location history trail of a vehicle's routes over a week's time period in accordance with the preferred embodiment of the present invention.

Conventional systems commonly refer to location data as location history, or a breadcrumb trail, FIG. 7 illustrates a graphical display 700 for requesting location history, and the parameters used to request location history for a particular user 702 or group 701 of users for a specified time period 704 & 705 or a location history query for the last number of locations 703 recorded. As those skilled in the art will appreciate, FIG. 8 illustrates a graphical map display 800 of a location history trail 801 & 802 & 804 for a single user that traveled in a vehicle over the course of a week. The vehicle was transmitting its position every minute to an online server. The first evident problem with this prior art system is that a user does not have a-priori knowledge of the periods of time during which meaningful location history data was stored on the server, so the user's location history request is based on guess of where data might exist. Since this data for several trips may overlap in time and space, it is not a simple task to remember when to request data for a specific time period, and if the time range is too large, or the route was traveled extensively, the user will obtain mixed trip data within their graphical view.

For example, the highly dense route 803 that is illustrated spatially between the displayed boundaries 805 & 806 includes twenty-four repeated trips. Since this location information is staggered in time, specifying only a range of time in order to retrieve and view this information is not adequate to visualize this data properly. It is analogous to reaching your hand into a murky river and trying to grab a specific type of fish that you assume is present during that time of the day. You might get a hold of a fish, but most likely it is the wrong fish, since you cannot see into the water. As people skilled in the art will appreciate, the Location Calendar (i.e., calendar and Gantt view) provides a revolutionary method of viewing high-level Meta data, and providing the ability to drill-down into the location data of interest, quickly and efficiently.

Figure 9:
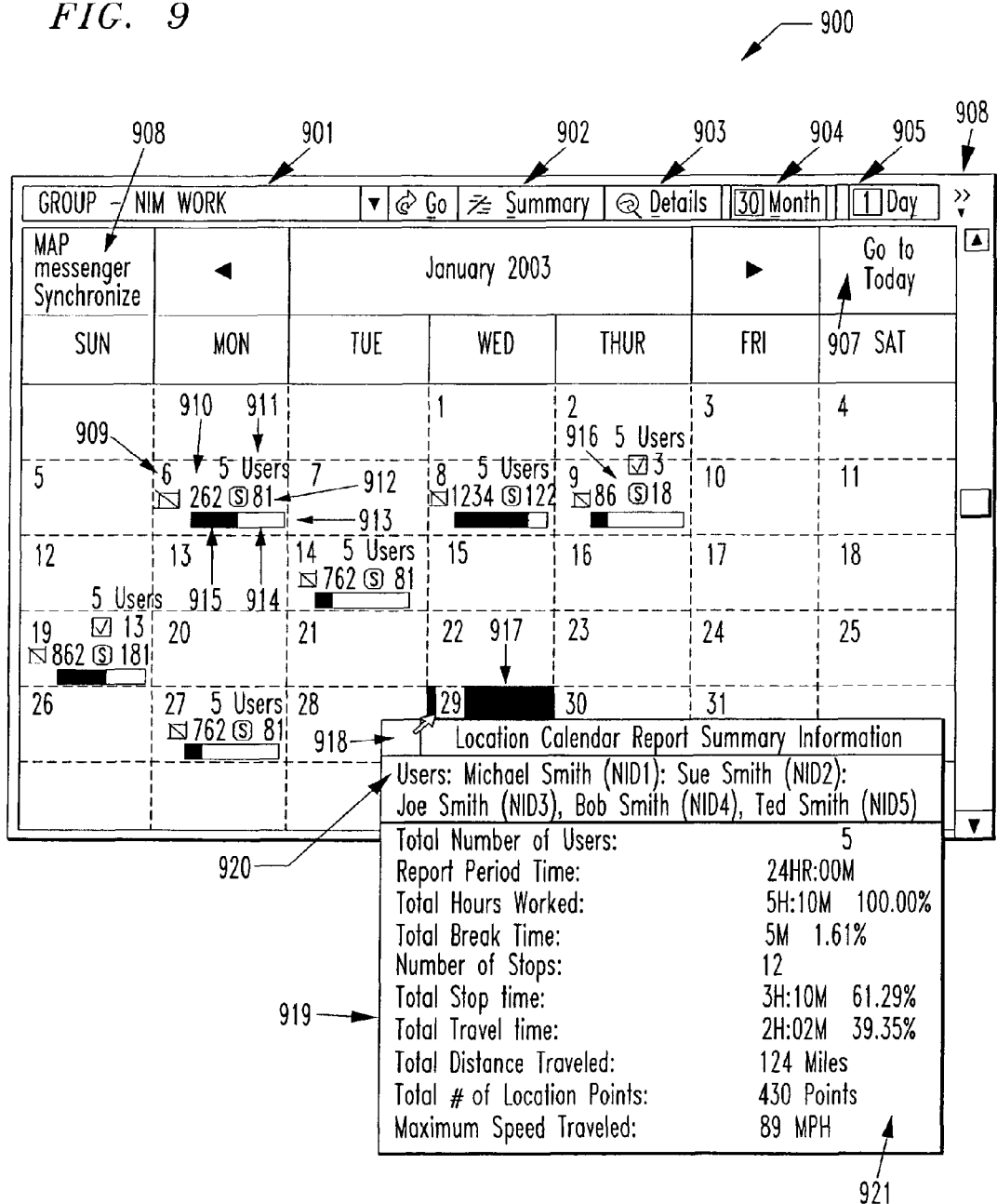
FIG. 9 illustrates another aspect of the present invention for graphically displaying various Meta data in a Calendar View for a given month and a summary of Meta information for a given day within that month.

In one embodiment, as illustrated in FIG. 9, the location history calendar application view 900 consists of a toolbar 906 that provides a month view 904, a day view 905, a details view 903, a summary view 902, and a user/group selection drop-down menu 901 for providing a list of the available users for which the user of this application 900 has access or permissions to view said Meta information, such as, but not limited to, location history information. This calendar view displays information for each day 909 of the entire month and graphically illustrates the summary information of various types of Meta data contained for the group or user that was selected 901 for said month. For example, in this embodiment, the displayed high-level Meta data includes the number of users for which information is available for this particular day 909 and/or selection 901. In this embodiment, this Meta data also includes the number of detailed GPS location points recorded 910 and the total number of stops recorded 912 for the user or group of users for this particular day 909.

Additionally a graphical bar 913 illustrates the total stop time 915 relative to the total moving time 914 that the user/device and/or group of users/devices recorded for this particular day 909. For other days, when other Meta data is present 916, such as, but not limited to, a message, voice recording, recorded image, recorded movie, etc., other icons 916 are present illustrating the total number of said Meta data activity for the user/device and/or group of users/devices recorded for this particular day. It should be noted that the icon 916 is displayed to graphically illustrate a broad range of possible Meta data, and is not specific to any particular Meta data type. When a specific day or group of days is selected 917 using a computing pointing device 918, known as a mouse to those skilled in the art, a drop-down window 919 is displayed illustrating more detailed summary information for the Meta data contained for this day or group of days that were selected and for the user/device and/or group of users/devices that were selected 901. This drop down window 919 can also be viewed by selecting the appropriate day and then selecting the summary button 902 in the menu bar 906 using a pointing device, known as a mouse to those skilled in the art.

The summary window 919 illustrates the total number of users that were used to compile the summary information, where each user is displayed 920 as their full name and user ID, denoted here as the NID (i.e., Networks In Motion ID). The summary information of Meta data 921 includes in this embodiment, but is not limited to, the following information:
—Location Calendar Report Summary Information—
1. Total Number of Users
2. Report Period Time
3. Total Hours Worked
4. Total Break Time
5. Total Number of Stops
6. Total Stop Time
7. Total Travel Time
8. Total Distance Traveled
9. Total # of Locations Points Recorded
10. Number of Excessive Speed Events Recorded
11. Maximum Speed Traveled The location calendar provides a synchronize button 908 that will synchronize the Meta data from a remote location, either a server and/or other client, from the time of the previous synchronization event to the present time. It should be noted that this invention also allows for the ability of the application to automatically synchronize the Meta data at some autonomously scheduled timed or other event, such as when the Operating System (OS) is in an idle state or the application is in an idle state, or any internal or external notification event, such as an e-mail, or mouse or keyboard click from a peripheral hardware device, or the like. In this embodiment, the application provides the user with the ability to jump to the current day by clicking the "Go to Today" button 907 using a standard mouse icon 918.

Figure 10:
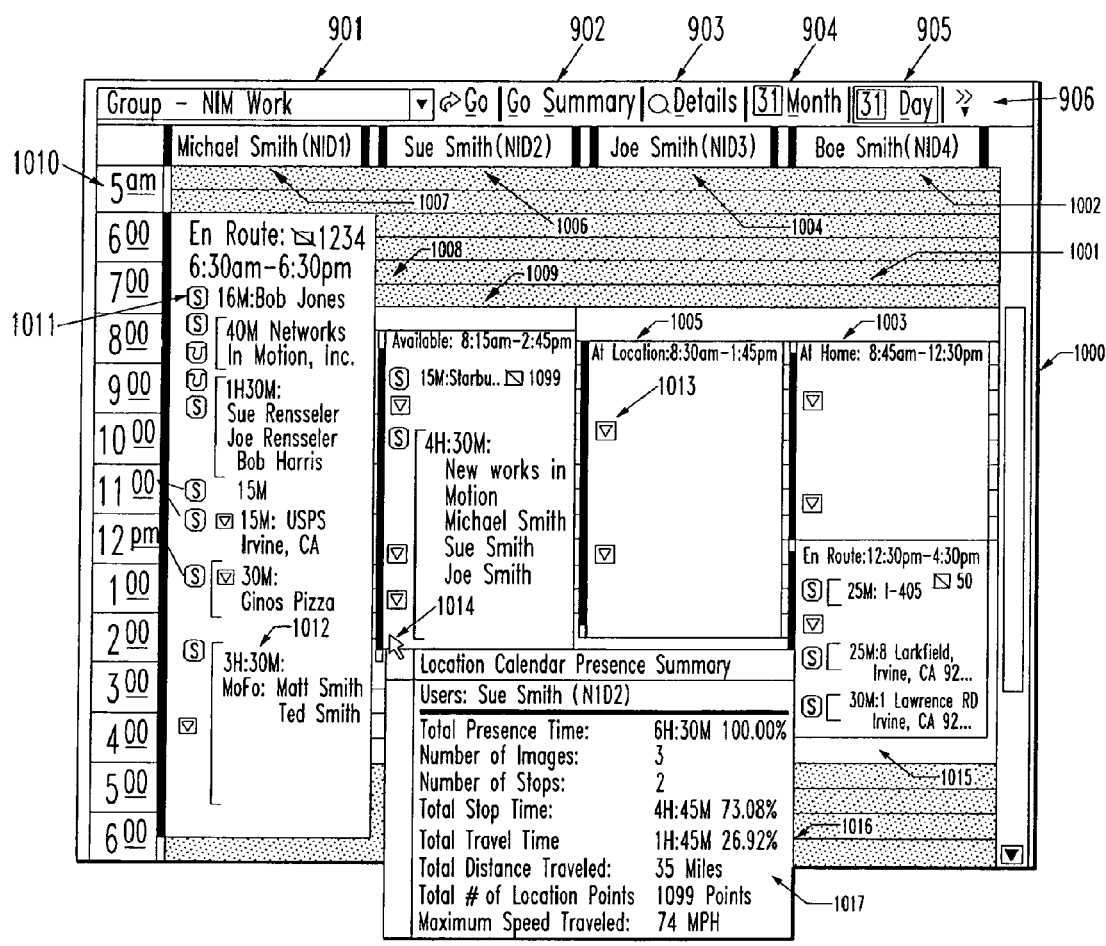
FIG. 10 illustrates another aspect of the present invention for graphically displaying various Meta data in a Day View.

The day view 905 can be viewed in more detail, as illustrated in FIG. 10. This new application view 1000 provides a detailed day view 1001 for displaying presence events 1008 & 1009 & 1005 & 1003 & 1015 and their associated Meta data, such as stop data 1011, stop duration 1012, and additional Meta data 1013, such as images, messages, voice recordings, or the like. The presence information 1008 & 1009 & 1005 & 1003 & 1015 is illustrated in a temporal view 1010 that allows the selection 901 of a user/device and/or group of users/devices whose Meta data for the particular day view is displayed.

The user information 1007 & 1006 & 1004 & 1002 is aligned with the Meta data that is associated with their accounts. A summary window 1016 can also be displayed by selecting the desired presence 1009 and clicking it using a point device 1014, known as a mouse to those skilled in the art. The summary information 1017 is similar to that displayed in the calendar month view, however the detailed summary information of Meta data is specific to the specified presence 1009 and user 1006 that was selected. It should be noted and appreciated by those skilled in the art that the recorded stops also display, when available, the nearby POI or user contact list that the stop's location was nearest, thus providing a more detailed report of the recorded Meta data.

Figure 11:
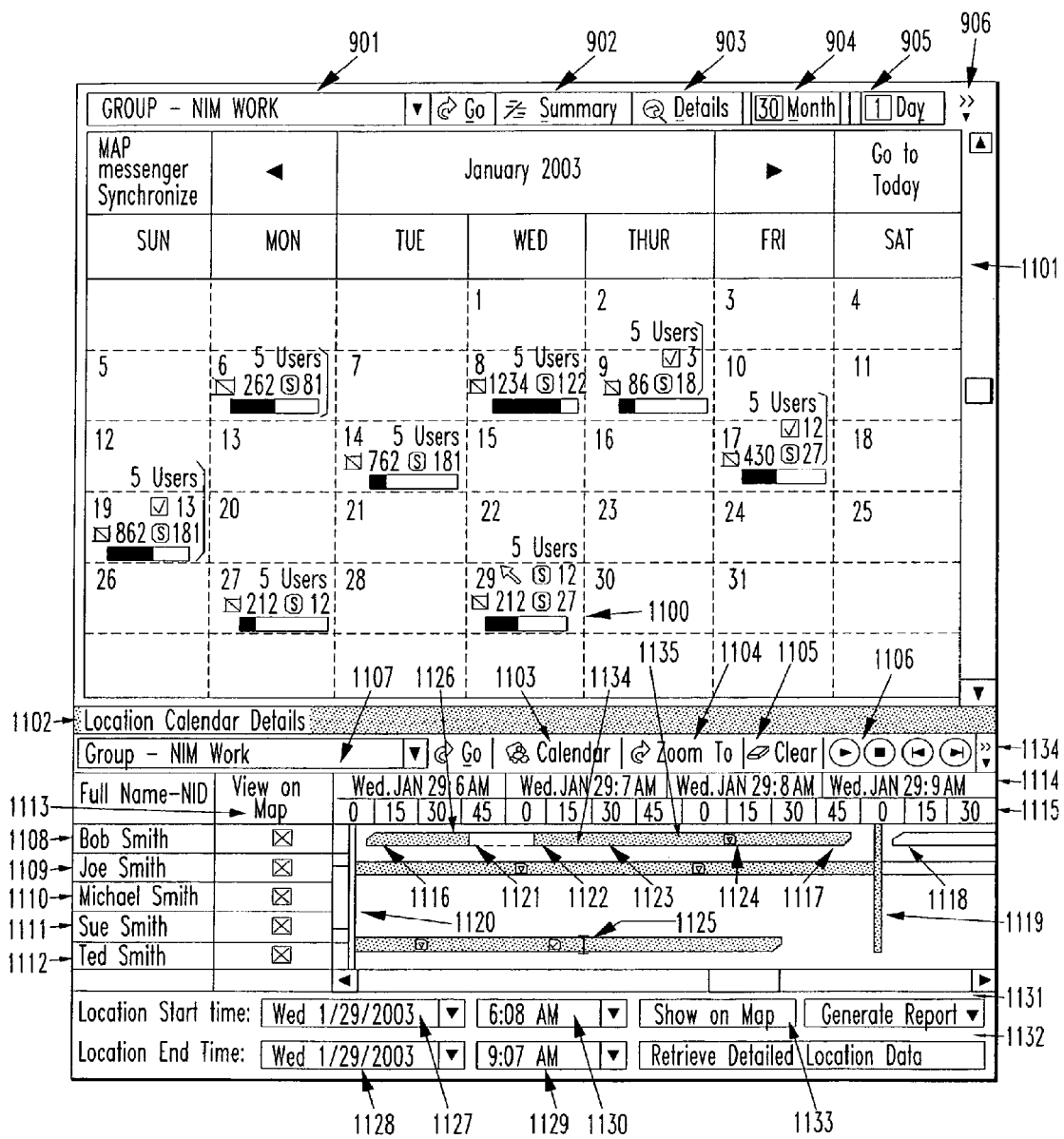
FIG. 11 illustrates another aspect of the present invention for graphically displaying various Meta data in both a Calendar View and Gantt View, where the Gantt View provides more detailed Meta data relationships in a temporal format for specific users or devices.

The details view button 903, as illustrated in FIG. 11, provides the ability, from the calendar view or day view, to open the details view window 1114 named the "Location Calendar Details" 1102. This window 1114 provides both a summary and high-level Meta data overview in a temporal format 1115. This Gantt view allows users to graphically view presence and associated Meta data for individual users 1108 & 1109 & 1110 & 1111 & 1112 in a very concise way. For example, this application window 1114 allows a user to specify the Meta data start date 1127 and time 1130 and Meta data end date 1128 and time 1129. Selecting a temporal range will provide a translucent window 1119 & 1120 that selects and zooms to the bounded temporal request. Within this range are the various types of presences. A day's temporal range can also be selected using the calendar view, by first selecting the desired day 1100 and then selecting the details view button 903. There are presences 1126 that have start 1116 and end times 1117, while other presence states extend throughout the selected period without any state change. Some presence even have presence transition 1125, such as a presence state change from "En Route" to "Available", both presence states are online defined presence states. A presence that transitions from an offline state to an online state and has location Meta data associated is depicted 1116 with the up green transition point. A presence that transitions from an online state to an offline state and has a location Meta data associated is depicted 1117 with the down green transition point. A presence transition from either an online-to-offline state or an offline-to-online state change without location Meta data association has a black color 1118 up or down transition point instead of green 1116 up or down transition point.

A presence that has a dotted line illustrates that the wireless client lost wireless coverage for that period of time. The start 1121 and end 1122 of the dotted lines also can have location Meta data associated with the out-of-coverage presence information, in order to provide more useful information about the users' 1108 events for the day. As previously illustrated, a presence 1126 can have other Meta data associated with it, such as a stop event 1123. A stop event typically has a start time 1134 and end time 1135 and usually has location Meta data associated with the stop event 1134, since a stop is a singular event in space, but not time (i.e., it has a time duration).

Additional Meta data, such as an image, voice recording, message, or the like, is also illustrated in this application window view 1114 by use of an icon 1124. Different icon images can be used to display various type of Meta data, however for this embodiment the same icon 1124 was used to illustrate various types of Meta data. The Location Calendar Details 1102 application window 1114 is preferably provided with its own toolbar 1134. This toolbar provides a link to the calendar view 1103, the ability to zoom 1104 to any location-related Meta data contained in this view 1114 on a map, and the ability to clear 1105 the displayed mapped items once viewed. Additionally, this toolbar 1134 is provided with a feature 1106 to play, pause, step-through, and skip backwards and forwards to various Meta data events for any particular user and have this information displayed on a map if location Meta information is present. Additionally, this application window 1114 provides the user with the ability to show any location-capable Meta information on the map 1113 and to generate various reports 1131, such as a stop report, an activity report, a fuel usage report, or the like, for the specified time range and user.

An aspect of the present invention that needs to be further illustrated is the ability to retrieve detailed location data 1132 for any user, presence, time period, or the like.

More specifically, the application in one embodiment of the present invention synchronizes itself with the server for the purpose of retrieving all Meta information, except detailed location Meta data, such as illustrated by the group of location points 211 in FIG. 2. As people skilled in the art will appreciate, detailed location Meta data is not very useful, as shown in FIG. 8, since most information about a user or device's location can be illustrated with presence and stop information. Therefore, in this embodiment, all of the detailed location Meta data (i.e., location data that is not associated with other Meta data other than by presence data 503 & 505 & 506 & 507 & 527 & 528 & 529) is not initially synchronized, but only upon demand or use.

For example, if a user selects, using a pointing device, the presence 1126 for Bob Smith and double clicks the selected presence, the application will request all of the detailed location Meta data associated with that presence from the server and display said detailed location data on the map. This example will be further illustrated in FIG. 15. The important factor is that only the necessary Meta data required to describe the user's history is displayed and the other Meta data is available upon request. This provides a useful and necessary visual tool for conveying information that is not possible in prior art applications, such as the one depicted in FIG. 7 and FIG. 8.

Figure 12:
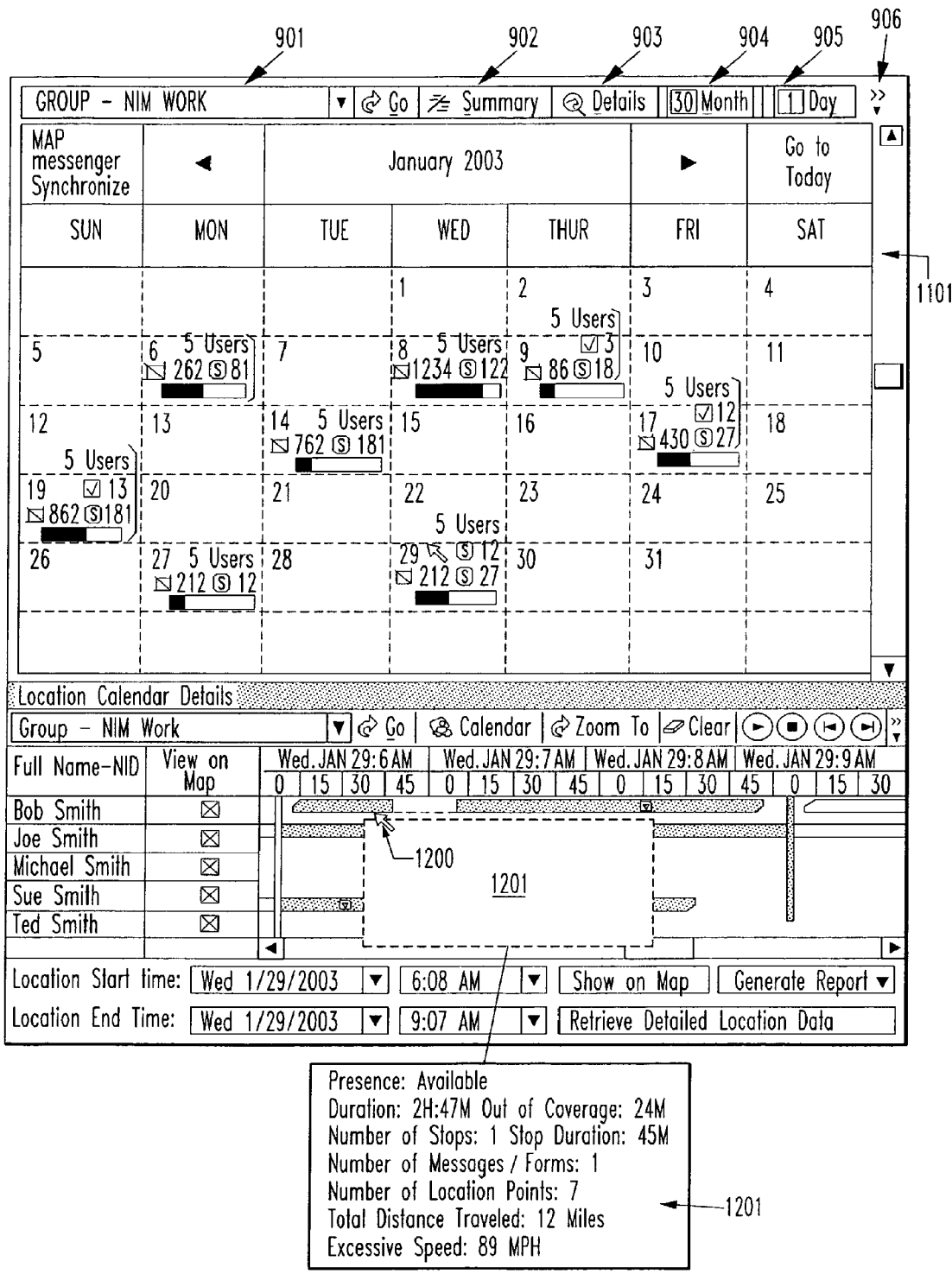
FIG. 12 illustrates another aspect of the present invention for graphically displaying summary information for a particular presence state.
Figure 13:
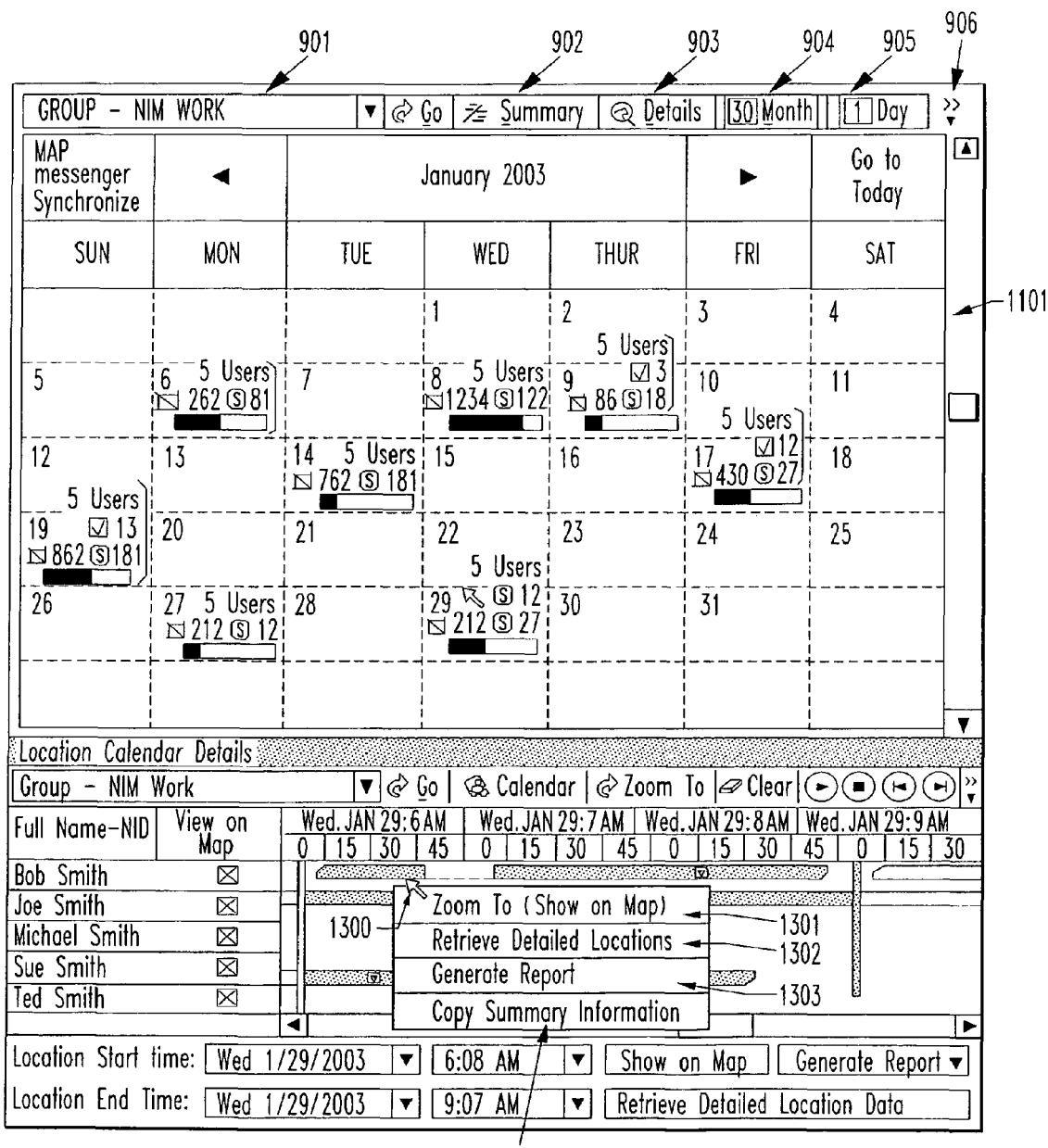
FIG. 13 illustrates another aspect of the present invention for graphically displaying and retrieving spatial-related information that is associated with a presence thread using a temporal Gantt view window.

FIG. 12 illustrates a convenient way to obtain detailed textual summary information 1201, in the form of a pop-up window, or tool tip to those skilled in the art, about a presence for a given user over an illustrated time range. The textual summary information provides a summary of the Meta data associated with the specified presence, such as, but not limited to:

1. Presence Duration
2. Out of Coverage Duration
3. Total Number of Stops
4. Total Stop Duration
5. Total Number of Messages/Work Order Forms
6. Total Number of Location Points
7. Total Distance Traveled
8. Total # of Detailed Locations Points Recorded
9. Number of Excessive Speed Events Recorded
10. Maximum Speed Traveled In one embodiment, this invention provides the ability to map location Meta data, retrieve detailed location data, and generate reports using the graphical temporal view, such as the Calendar and/or Gantt view. As an example, FIG. 13 illustrates, for a specified presence, the ability to show 1301 the Meta data on a map view, retrieve detailed location for any given presence, user, or time range 1302, and generate a report 1303 for any given presence, user, or time range.

Figure 14:
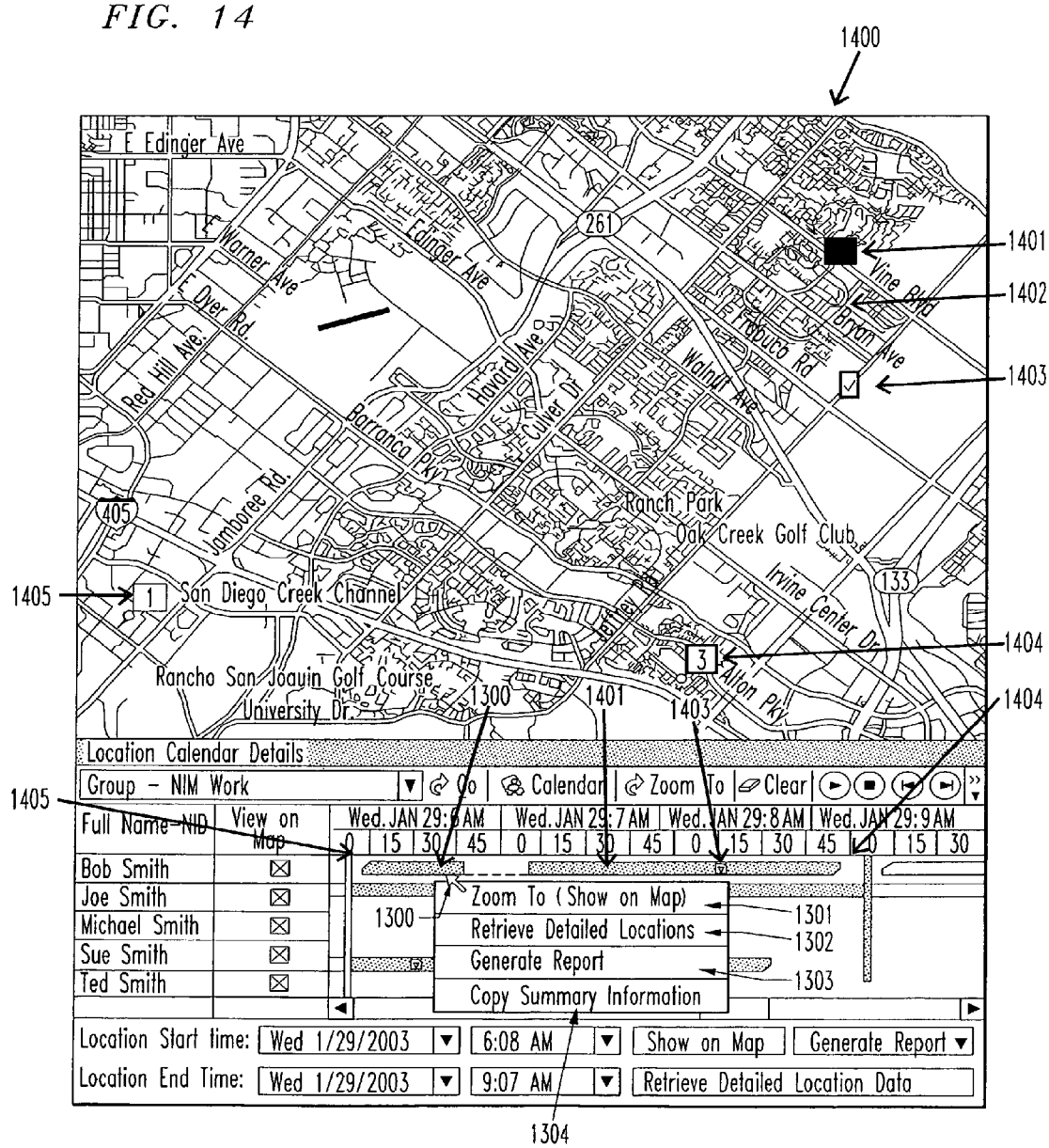
FIG. 14 illustrates another aspect of the present invention for graphically displaying, in a map view format, the retrieved high-level Meta data for the selected presence thread.

As shown in FIG. 14, in one embodiment, a user that requests to zoom to and map 1301 a presence causes the application to display a map view 1400 and the transition points of the presence that have location Meta data associations, such as the start 1405 of the presence, the stop point 1401 recorded during the presence, the image 1403 recorded during the presence, and the end of the presence 1404. The map view also illustrates the optimized route of the presence to each of the route's destination points (i.e., origin 1405, stop 1401, via 1403, and end 1404).

Figure 15:
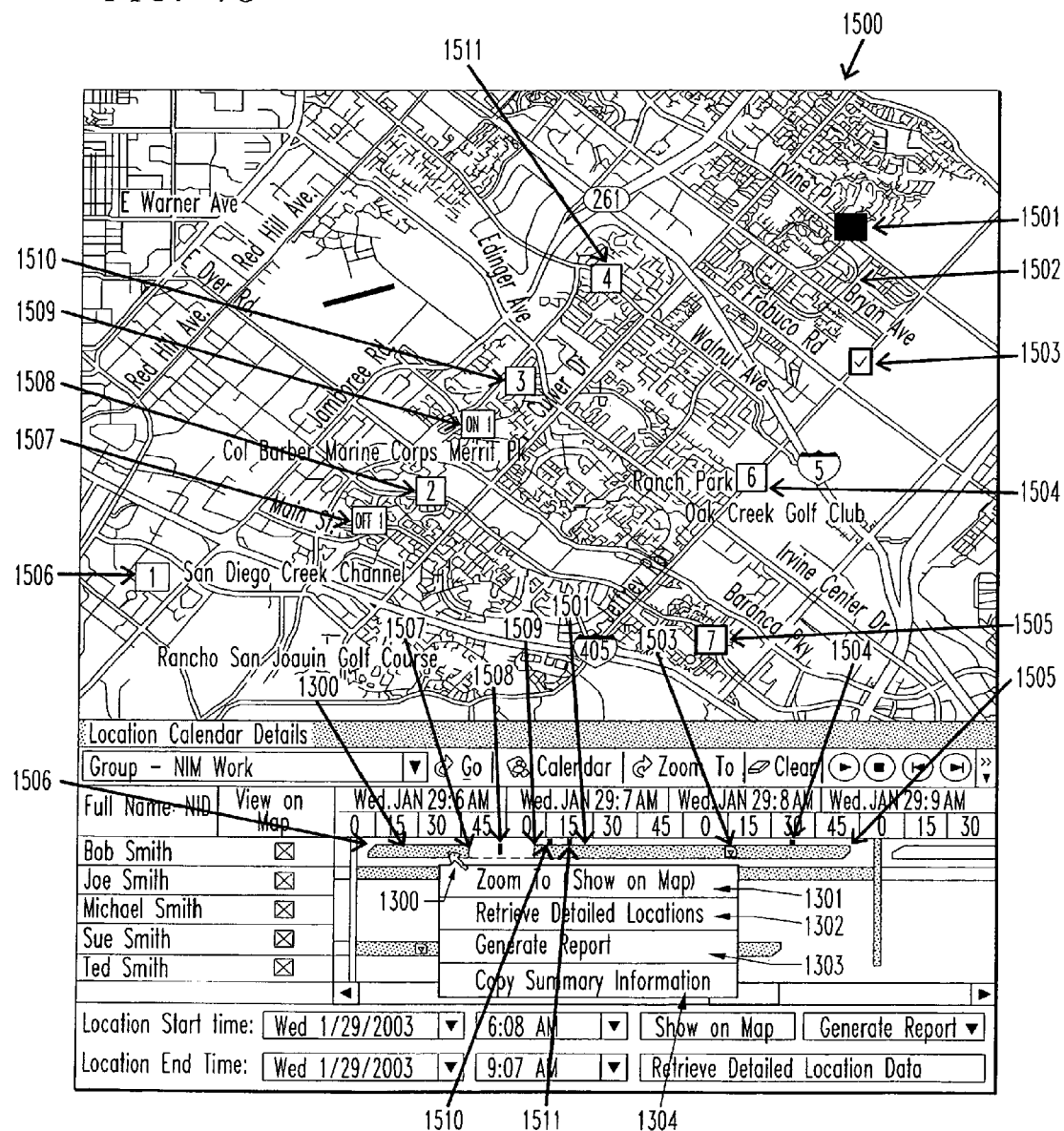
FIG. 15 illustrates another aspect of the present invention for graphically displaying, in a map view format, both the retrieved high-level Meta data and retrieved detailed location data for the selected presence thread.

In another embodiment of this present invention, FIG. 15 shows the same map view 1500 of FIG. 15, however the detailed location menu 1302 was selected for this particular presence. That invokes the retrieval, either locally or remotely, of the detailed location Meta data and displays that information on the map 1507 & 1508 & 1509 & 1510 & 1511 & 1504 in addition to the origin 1506, stop 1501, image 1503, and the route end point 1505 that is normally associated with a presence. Note that the out-of-coverage 1507 (i.e., the location when the wireless device lost network coverage) and in-coverage 1509 (i.e., the location when the wireless device acquired network coverage again) location Meta data points are also illustrated in addition to a location Meta data point 1508 that was intended to be sent while the wireless device did not have network coverage. This point 1508 was queued until the wireless device reacquired network coverage again 1509.

Additionally, other location Meta data points were sent, such as with a Delta-T or Delta-X mode, during the course of this presence 1510 & 1511 & 1504. These location Meta data points 1507 & 1508 & 1509 & 1510 & 1511 & 1504 are also illustrated in the presence Gantt chart.

Figure 16:
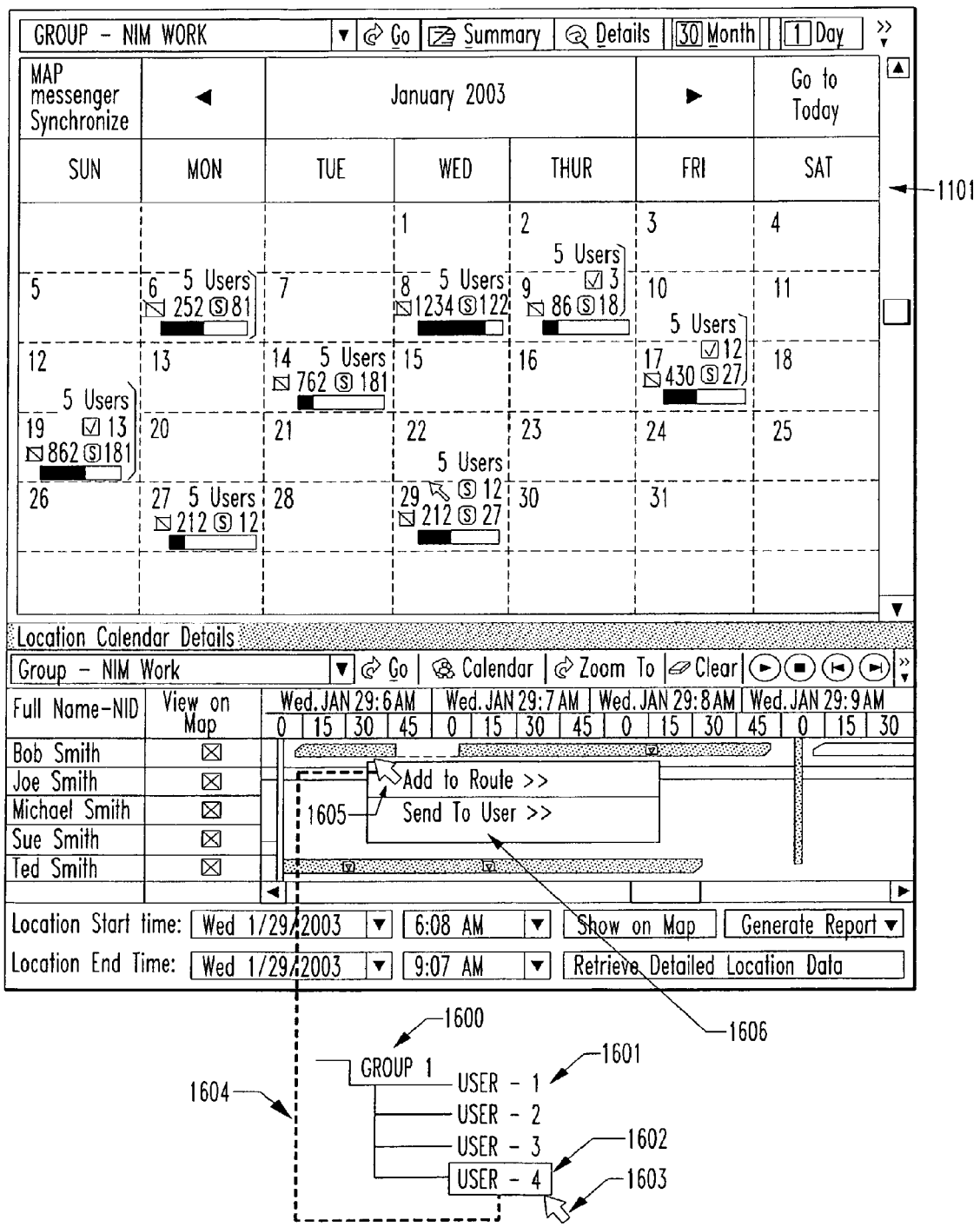
FIG. 16 illustrates another aspect of the present invention for graphically sending or sharing collected and stored Meta data associated with the selected presence thread and/or temporal time period.

The preferred embodiment of the present invention provides the capability of sending, saving to a file, e-mailing, and building upon, location and/or Meta data to a single or plurality of users using a common thread, such as presence information, user information, temporal information, calendar information, or the like, and using a graphical display, such as a Calendar or Gantt chart view, to view the information. By sending this common thread to a single or plurality of users, the sender grants the recipients the same or limited access ("use rights") to information associated with this common thread for a specified or unlimited time period. FIG. 16 illustrates how a user would graphically send a common thread to a group or single user. For example, after selecting the presence using a pointing device 1605, such as a mouse, a user would either drag-and-drop 1604 the presence to the icon representation of the destination user 1602, typically contained in a roster list group 1600 or as individual users 1601 & 1602. Releasing (i.e., dropping) the presence using the pointing device icon 1603 onto the desired user 1602 and/or group will cause the thread to be sent. This provides the destination user with limited-access use rights, such as for a specified or unlimited time period, for information associated with this common thread. Conversely, in another embodiment, a user can right-click on the presence and select the desired user from a list of users to send 1606 the thread to, similar to the roster list.

Figure 17:
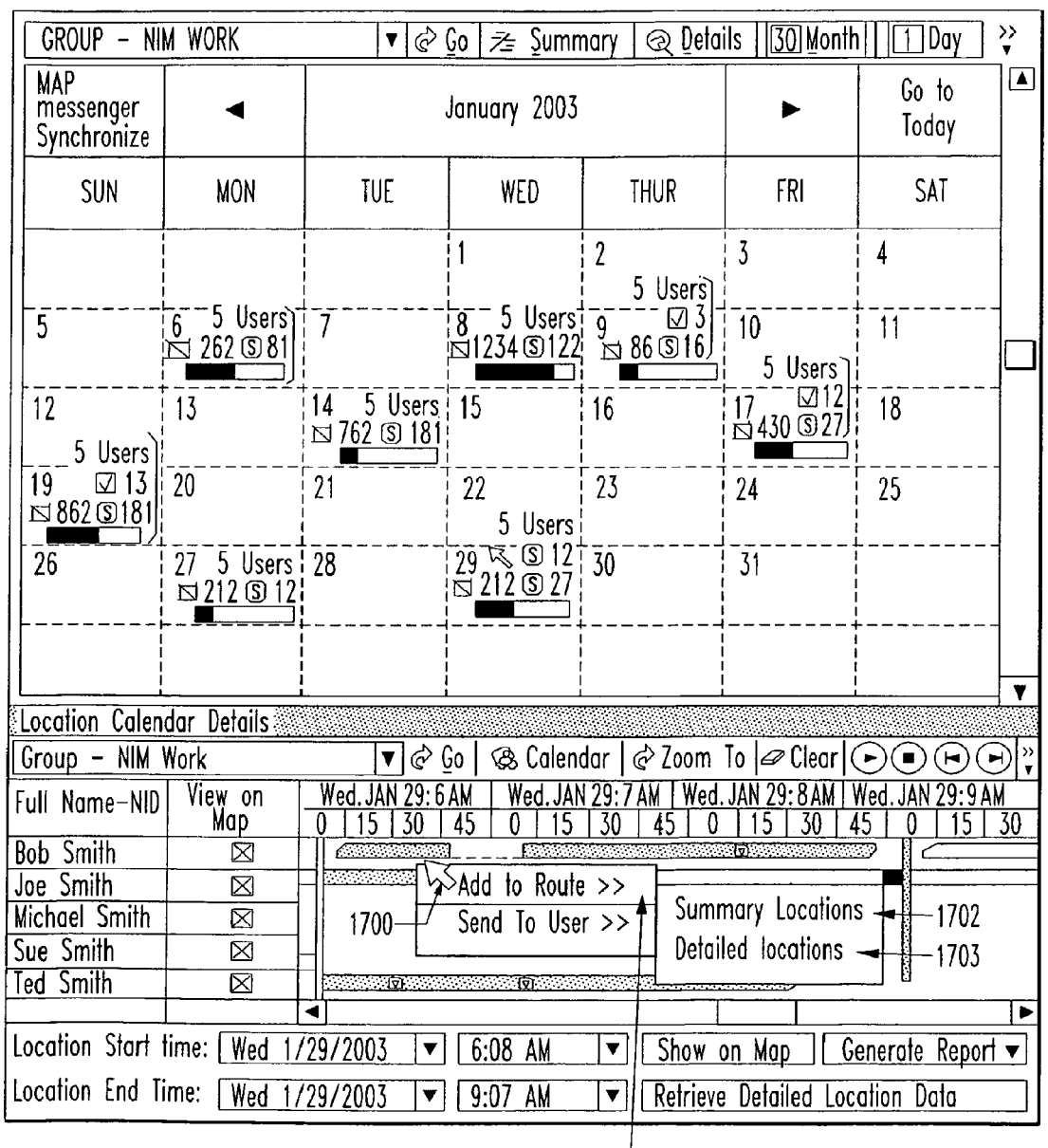
FIG. 17 illustrates another aspect of the present invention for graphically adding spatial-related information, such as origin, stops, vias, and destination (i.e., route end point) points to a route planner or editor which may consist of only high-level Meta data and/or detailed location data.

FIG. 17 illustrates how a user would add a common thread, such as a presence or period of time to a route planner using a pointing device 1700, such as a mouse. In one embodiment, by selecting the presence and right clicking, a term commonly know to those skilled in the art, a new window will appear that allows the user to add the summary location Meta data 1702 or the detailed location Meta data 1703 to the route planner. Additionally, the user can drag-and-drop the presence into a route planner, similar to sending a presence thread to another user.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

What we claim:

1. A method of sharing travel information including time-stamped meta data, comprising:
   receiving, at a physical server, a plurality of location information points respectively associated with a first mobile communication device over a given time;
   associating a unique thread ID with said plurality of location information points;
   identifying meta data associated with said unique thread ID, including messages sent by said first mobile communication device; and
   transmitting, to a second mobile communication device, said plurality of location information points, together with said meta data including messages sent by said first mobile communication device while at at least one of said plurality of location information points.

2. The method of sharing travel information including time-stamped meta data according to claim 1, further comprising:
   obtaining said plurality of location information in a Delta-T mode of operation of a location device associated with said first mobile communication device.

3. The method of sharing travel information including time-stamped meta data according to claim 1, further comprising:
   obtaining said plurality of location information points in a Delta-X mode of operation of a location device associated with said first mobile communication device.

4. The method of sharing travel information including time-stamped meta data according to claim 1, further comprising:
   obtaining said plurality of location information points in a georeferenced mode of operation of a location device associated with said first mobile communication device.

5. The method of sharing travel information including time-stamped meta data according to claim 1, further comprising:
   linking a plurality of presence states of said first mobile communication device, to said unique thread ID.

6. The method of sharing travel information including time-stamped meta data according to claim 1, wherein:
   said meta data includes a stop condition of said first mobile communication device.

7. The method of sharing travel information including time-stamped meta data according to claim 1, wherein:
   said meta data includes an email message sent by said first mobile communication device.

8. The method of sharing travel information including time-stamped meta data according to claim 1, wherein:
   said meta data includes a digital image obtained by said first mobile communication device.

9. A method of sharing travel information including time-stamped meta data, comprising:
   receiving, at a physical server, a plurality of location information points respectively associated with a first mobile communication device over a given time;
   associating a unique thread ID with said plurality of location information points;
   identifying meta data associated with said unique thread ID, including messages received by said first mobile communication device; and
   transmitting, to a second mobile communication device, said plurality of location information points, together with said meta data including messages received by said first mobile communication device while at at least one of said plurality of location information points.

10. The method of sharing travel information including time-stamped meta data according to claim 9, further comprising:
obtaining said plurality of location information in a Delta-T mode of operation of a location device associated with said first mobile communication device.

11. The method of sharing travel information including time-stamped meta data according to claim 9, further comprising:
obtaining said plurality of location information points in a Delta-X mode of operation of a location device associated with said first mobile communication device.

12. The method of sharing travel information including time-stamped meta data according to claim 9, further comprising:
obtaining said plurality of location information points in a georeferenced mode of operation of a location device associated with said first mobile communication device.

13. The method of sharing travel information including time-stamped meta data according to claim 9, further comprising:
linking a plurality of presence states of said first mobile communication device, to said unique thread ID.

14. The method of sharing travel information including time-stamped meta data according to claim 9, wherein:
said meta data includes a stop condition of said first mobile communication device.

15. The method of sharing travel information including time-stamped meta data according to claim 9, wherein:
said meta data includes an email message received by said first mobile communication device.

16. The method of sharing travel information including time-stamped meta data according to claim 9, wherein:
said meta data includes a digital image obtained by said first mobile communication device.

\* \* \* \* \*